(12) United States Patent
Hara

(10) Patent No.: US 6,807,470 B2
(45) Date of Patent: Oct. 19, 2004

(54) VEHICLE CONTROL SYSTEM

(75) Inventor: Junichiro Hara, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/603,820

(22) Filed: Jun. 26, 2003

(65) Prior Publication Data

US 2004/0093149 A1 May 13, 2004

(30) Foreign Application Priority Data

Jun. 27, 2002 (JP) ....................... 2002-187234

(51) Int. Cl.$^7$ .............................................. G06F 7/00
(52) U.S. Cl. ........................... 701/36; 701/54; 701/101; 165/271; 62/181
(58) Field of Search ............................. 701/54, 36, 99, 701/101; 236/35, 35.2, 35.3; 62/181, 183, 184; 165/41, 42, 271

(56) References Cited

U.S. PATENT DOCUMENTS

| | | | | |
|---|---|---|---|---|
| 4,667,480 A | * | 5/1987 | Bessler | 62/180 |
| 4,825,663 A | * | 5/1989 | Nijjar et al. | 62/236 |
| 5,205,484 A | * | 4/1993 | Susa et al. | 236/35.3 |
| 5,408,843 A | | 4/1995 | Lukas et al. | |
| 6,415,746 B2 | * | 7/2002 | Kobayashi et al. | 123/41.12 |

FOREIGN PATENT DOCUMENTS

| | | |
|---|---|---|
| DE | 10130181 A1 | 2/2002 |
| EP | 0965737 A2 | 12/1999 |
| EP | 1110774 A2 | 6/2001 |
| EP | 1154132 A2 | 11/2001 |
| EP | 1239129 A2 | 9/2002 |

* cited by examiner

Primary Examiner—Richard M. Camby
(74) Attorney, Agent, or Firm—Wenderoth, Lind & Ponack, L.L.P.

(57) ABSTRACT

A vehicle control system capable of achieving improvement in fuel efficiency by performing optimum control over an engine in consideration of power load applied onto an engine by auxiliary machines. An engine control amplifier 2 includes: a temperature-dependent engine control section 16 that controls a fuel consumption amount of an engine 1 based on at least one of a water temperature and an oil temperature of the engine 1; a power-dependent engine control section 17 that controls the fuel consumption amount of the engine 1 based on an electric power mainly consumed by a cooling motor fan 15 in a vehicle; and an airconditioning-dependent engine control section 18 that controls the fuel consumption amount of the engine 1 based on a refrigerant discharge rate of an airconditioning compressor 11, and the engine control amplifier 2 derives the combination of controls over the auxiliary machines that minimizes the fuel consumption amount of the engine 1 by an optimizing technique, to control the auxiliary machines.

18 Claims, 18 Drawing Sheets

F I G. 16
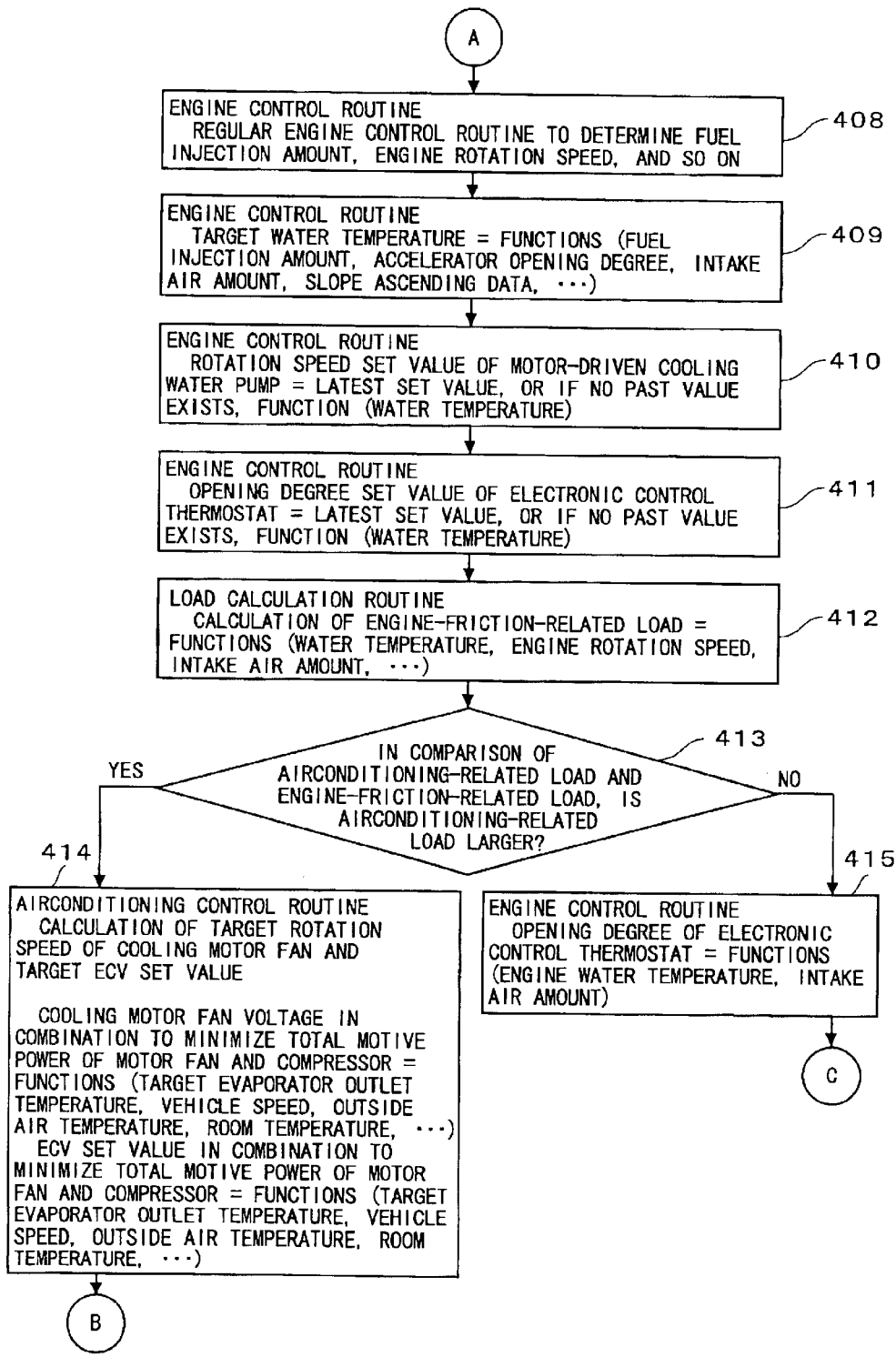

F I G. 1 8
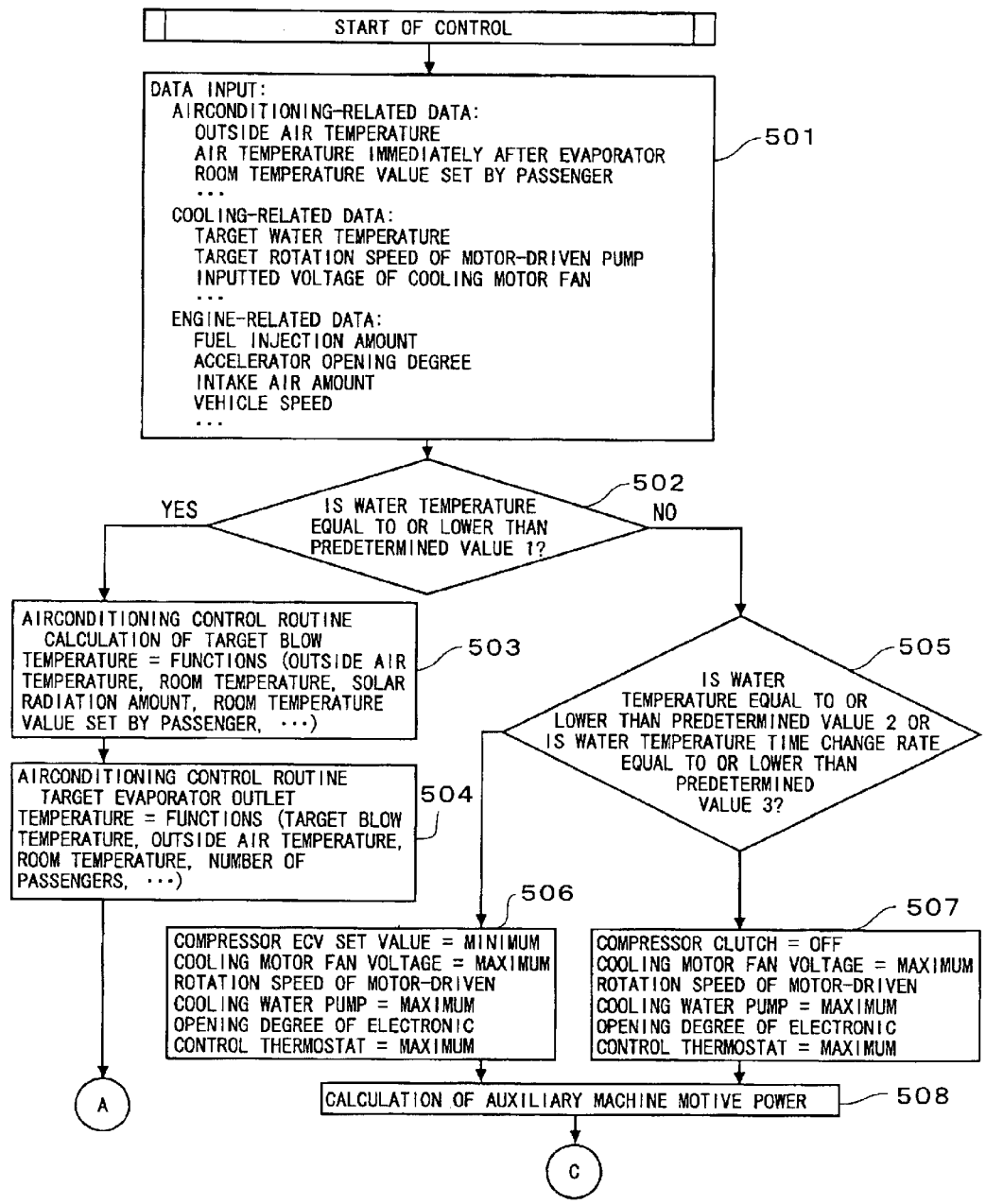

VEHICLE CONTROL SYSTEM

BACKGROUND OF THE INVENTION

1. Field of the Invention

The present invention belongs to a technical field of a vehicle control system that performs optimum control over an engine in consideration of power load applied onto the engine by auxiliary machines.

2. Description of the Related Art

A control system disclosed in, for example, Japanese Patent Laid-open No. Hei 6-137148 is well known as a control system of this type.

This prior publication describes a technique for controlling a cooling fan with the aim of controlling the operation of the cooling fan according to the operation state of an airconditioner, the control being performed in such a manner that the use of a thermostat is switched over, according to the operating ratio of an airconditioning compressor, between a low-temperature setting thermostat and a high-temperature setting thermostat, which are provided in parallel in an engine cooling water circulation circuit.

Specifically, in this prior art, when the operating ratio of the airconditioning compressor is equal to or higher than a set value, an engine cooling water is made to flow toward the low-temperature setting thermostat side. Consequently, the engine cooling water is controlled to a temperature in a lower range, so that the temperature rise by a radiator is controlled to a low level, which inhibits the temperature rise in an engine room. On the other hand, when the operating ratio of the airconditioning compressor is lower than the set value, the engine cooling water is made to flow toward the high-temperature setting thermostat side, so that the engine cooling water is controlled to a temperature in a higher range to improve engine efficiency.

The above-described prior art, however, has the following problems.

Specifically, the engine cooling water is controlled to a temperature in a lower range under the condition in which the airconditioning heat load on a vehicle side is high as in summer, while the engine cooling water is controlled to a temperature in a higher range under the condition in which heating is necessary as in winter, which means that the water temperature is controlled independently of the engine load.

Therefore, even when the engine load is high as in, for example, an acceleration mode or a slope ascending mode, the engine cooling water is controlled to a temperature in a higher range since the operating ratio of the compressor is low in winter, and the cooling fan is operated at a high speed even in winter, which results in large power consumption for driving the fan. This increases the engine load due to the increase in the alternator load to further raise the water temperature.

Further, under the summer conditions, the control of the engine cooling water to a temperature in a lower range results in insufficient decrease in viscosity of a lubricating oil inside the engine, so that friction drag inside the engine becomes high compared with that in the case when the engine cooling water is controlled to an appropriately high temperature. This increases a fuel consumption amount by the engine to lower fuel efficiency.

SUMMARY OF THE INVENTION

The present invention is made in view of the above-described problems, and an object thereof is to provide a vehicle control system capable of controlling the total engine load expressed by the sum total of the loads given on an engine by auxiliary machines to improve fuel efficiency which is dependent on the total engine load.

In order to achieve the object stated above, a vehicle control system according to claim 1 of the present invention includes:

an engine configured to drive a vehicle;

an alternator as an auxiliary machine of the engine, driven mainly by the engine;

an airconditioning compressor driven mainly by the engine and having a refrigerant discharge rate control unit capable of adjusting a refrigerant discharge rate per one rotation;

a cooling motor fan driven by an electric power generated by the alternator, including a motor having a motor rotation speed control unit capable of adjusting a rotation speed of the motor, and being configured to introduce an outside air mainly to an airconditioning heat exchanger and an engine cooling heat exchanger;

an engine cooling unit configured to adjust at least one of a water temperature and an oil temperature of the engine; and a control unit configured to control the engine and auxiliary machines, the vehicle control system being characterized in that:

the control unit includes an engine control section consisting of:

a temperature-dependent engine control section configured to control a fuel consumption amount of the engine based on at least one of the water temperature and the oil temperature of the engine;

a power-dependent engine control section configured to control the fuel consumption amount of the engine based on an electric power essentially consumed by the cooling motor fan in the vehicle; and an airconditioning-dependent engine control section configured to control the fuel consumption amount of the engine based on the refrigerant discharge rate of the airconditioning compressor; and the control unit performs one of the following control operations:

to derive, by an optimizing technique, a combination of controls over the auxiliary machines that minimizes the fuel consumption amount of the engine, to control the auxiliary machines;

to control an object to be controlled involved in at least two engine control sections among the engine control sections, prior to other objects to be controlled, in order to minimize the fuel consumption amount of the engine; and to control the auxiliary machines in descending order of magnitude of motive power.

A vehicle control system according to claim 2 includes:

an engine configured to drive a vehicle;

a transmission unit configured to transmit a motive power generated in the engine to a vehicle driving system by changing a rotation speed;

an alternator as an auxiliary machine of the engine, driven mainly by the engine;

an airconditioning compressor driven mainly by the engine and having a refrigerant discharge rate control unit capable of adjusting a refrigerant discharge rate per one rotation;

a cooling motor fan driven by an electric power generated by the alternator, including a motor having a motor rotation speed control unit capable of adjusting a rotation speed of the motor, and being configured to introduce an outside air mainly to an airconditioning heat exchanger and an engine cooling heat exchanger;

an engine cooling unit configured to adjust at least one of a water temperature and an oil temperature of the engine;

a transmission unit oil temperature adjusting unit configured to adjust an oil temperature of the transmission unit; and a control unit configured to control the engine and auxiliary machines, the vehicle control system being characterized in that:

the control unit includes an engine control section consisting of:

a temperature-dependent engine control section configured to control a fuel consumption amount of the engine based on at least one of the water temperature of the engine, the oil temperature of the engine, and the oil temperature of the transmission unit;

a power-dependent engine control section configured to control the fuel consumption amount of the engine based on an electric power mainly consumed by the cooling motor fan in the vehicle; and an airconditioning-dependent engine control section for controlling the fuel consumption amount of the engine based on the refrigerant discharge rate of the airconditioning compressor; and the control unit performs one of the following control operations:

to derive, by an optimizing technique, a combination of controls over the auxiliary machines that minimizes the fuel consumption amount of the engine, to control the auxiliary machines;

to control an object to be controlled involved in at least two engine control sections among the engine control sections, prior to other objects to be controlled, in order to minimize the fuel consumption amount of the engine; and to control the auxiliary machines in descending order of magnitude of motive power.

An invention according to claim 3 is characterized in that, in the vehicle control system according to claim 1 or claim 2, the control unit sets, as the optimizing technique, relational expressions between control amounts of the auxiliary machines and the fuel consumption amount of the engine, and derives a combination of optimum values that minimizes the fuel consumption amount based on the plural relational expressions by a mathematical technique such as an extremum finding algorithm or linear programming.

An invention according to claim 4 is characterized in that, in the vehicle control system according to claim 1 or claim 2, the control unit sets the cooling motor fan as the object to be controlled, in the control operation in which the object to be controlled involved in at least two engine control sections among the engine control sections is controlled prior to the other objects to be controlled in order to optimize the fuel consumption amount of the engine.

An invention according to claim 5 is characterized in that, in the vehicle control system according to claim 1 or claim 2, in the control operation in which the object to be controlled involved in at least two engine control sections among the engine control sections is controlled prior to the other objects to be controlled in order to minimize the fuel consumption amount of the engine or in the control operation in which the auxiliary machines are controlled in the descending order of the magnitude of the motive power, the control section controls at least one of the engine cooling unit and the transmission unit oil temperature adjusting unit prior to other objects to be controlled regardless of the control priority order when any one of the water temperature of the engine, the oil temperature of the engine, and the oil temperature of the transmission unit is equal to or higher than a set temperature, the control being performed so as to reduce the water temperature of the engine, the oil temperature of the engine, or the oil temperature of the transmission unit to a lower value than the set temperature.

An invention according to claim 6 is characterized in that, in the vehicle control system according to any one of claim 1 to claim 5, the engine cooling unit includes: a radiator configured to heat-exchange a cooling water with the outside air; a cooling water passage through which the cooling water circulates between the radiator and the engine; a water distribution amount adjusting unit configured to adjust a water distribution amount to the radiator; and a cooling water pump unit configured to adjust a circulated water amount of the cooling water.

An invention according to claim 7 is characterized in that, in the vehicle control system according to any one of claim 1 to claim 6, it further includes: an airconditioning unit including an airconditioning refrigeration cycle; an airconditioner setting unit through which a passenger makes a setting; and an airconditioning control unit configured to control the airconditioning unit based on the airconditioner setting unit, and that the airconditioning-dependent engine control section controls the refrigerant discharge rate of the airconditioning compressor and a rotation speed of the cooling motor fan via the airconditioning control unit, and while performing a control to minimize a total motive power of the airconditioning compressor and the cooling motor fan, the airconditioning-dependent engine control section controls the engine cooling unit according to a set condition of the cooling motor fan which is selected in the control to minimize the total motive power.

An invention according to claim 8 is characterized in that, in the vehicle control system according to any one of claim 1 to claim 7, the control unit controls the water distribution amount adjusting unit and the cooling water pump unit based on the set condition of the cooling motor fan and a target engine water temperature to make the water temperature of the engine equal to the target engine water temperature.

An invention according to claim 9 is characterized in that, in the vehicle control system according to any one of claim 1 to claim 8, the control unit varies control command values of the auxiliary machines including the airconditioning compressor to minimize a total load power of the alternator and the airconditioning compressor applied onto the engine, examines a change in the total load power, and automatically probes in which direction the control commands should be varied in order to minimize the total load power.

An invention according to claim 10 is characterized in that, in the vehicle control system according to claim 9, the control unit stores a result of the probe regarding in which direction the control command values of the auxiliary machines should be varied in order to minimize the total load power, according to a use condition of at least one of the auxiliary machines and the engine, and controls the auxiliary machines based on the stored contents.

In the invention according to claim 1, the control unit controls the auxiliary machines by any one of the following methods:

① using the optimizing technique in deriving the combination of the controls over the auxiliary machines;

② controlling an object to be controlled involved in the plural engine control sections prior to other objects to be controlled; and ③ controlling the auxiliary machines in the descending order of the magnitude of the motive power.

At the same time, the control unit controls the engine so as to minimize the fuel consumption amount based on at least one of the water temperature and the oil temperature of the engine, the electric power used in the vehicle, and the refrigerant discharge rate of the airconditioning compressor.

Therefore, in the present invention, the optimum control of the fuel consumption amount of the engine, in addition to the regular engine control, is possible while controlling the conditions of the water temperature or the oil temperature of the engine, airconditioning, and power generation. Consequently, the total engine load expressed by the sum total of the loads applied on the engine by the auxiliary machines can be controlled to a lower level. This makes it possible to achieve improvement in fuel efficiency which is dependent on the total engine load.

In the invention according to claim 2, since not only the engine but also the transmission is involved, it is possible to realize improvement in operation efficiency of the transmission, which makes it possible to realize improvement in fuel efficiency.

Further, as in the invention according to claim 3, it is also suitable that the mathematical relational expressions representing the correlation between the control amounts of the auxiliary machines and the fuel consumption amount of the engine are set as the optimizing technique to calculate these amounts by a mathematical optimum value solving method such as the extremum finding algorithm or the linear programming. Incidentally, for the extremum finding algorithm and the linear programming, refer to "Mathematical Model—Mathematization of Phenomena" (published in 1976 by Maruzen, and written by Kondo Jiro).

As in the invention according to claim 4, the cooling motor fan may be set as the auxiliary machine involved in the plural engine control sections so that the cooling motor fan is controlled prior to the other objects to be controlled. The cooling motor fan is the auxiliary machine involved in the temperature-dependent engine control section and the power-dependent engine control section.

In the invention according to claim 5, it is possible to prevent the engine from breaking due to an abnormally high temperature of the water or oil of the engine, which makes it possible to realize auxiliary machine control so as to minimize the fuel consumption amount in the state free from the possibility of the danger of the engine breakage.

In the invention according to claim 6, the water distribution amount adjusting unit (a so-called thermostat) that adjusts the water distribution amount to the radiator or the cooling water pump unit that transfers the cooling water is controlled, so that the temperature of the engine cooling water can be appropriately set.

In the invention according to claim 7, by controlling the combination of the airconditioning compressor and the cooling motor fan whose capacity and rotation speed are controllable by external signals respectively, it is possible to carry out such a control operation that optimizes (minimizes) the power load of the airconditioning compressor and the cooling motor fan while a certain level of cooling capability is maintained.

In the invention according to claim 8, the engine cooling unit is used in order to properly adjust the temperature of the engine cooling water based on the motor fan control determined by the airconditioning control, so that further improvement in fuel efficiency can be realized.

In the invention according to claim 9, in order to find an optimum control, more optimum direction, in other words, a control direction reducing the fuel consumption amount can be probed by correcting the control based on a pre-programmed control. This makes it possible to realize further improvement in fuel efficiency.

In the invention according to claim 10, the result of the probe in the control direction reducing the fuel consumption amount is stored for each condition for reutilization. This makes it possible to probe a better correction direction to realize further improvement in fuel efficiency.

BRIEF DESCRIPTION OF THE DRAWINGS

FIG. 16 is a flowchart showing the flow of the engine control in the engine control amplifier 2 of the fifth embodiment;

FIG. 18 is a flowchart showing the flow of engine control in an engine control amplifier 2 of a sixth embodiment;

DETAILED DESCRIPTION OF THE PREFERRED EMBODIMENTS

First Embodiment

First, the configuration will be explained.

Figure 1:
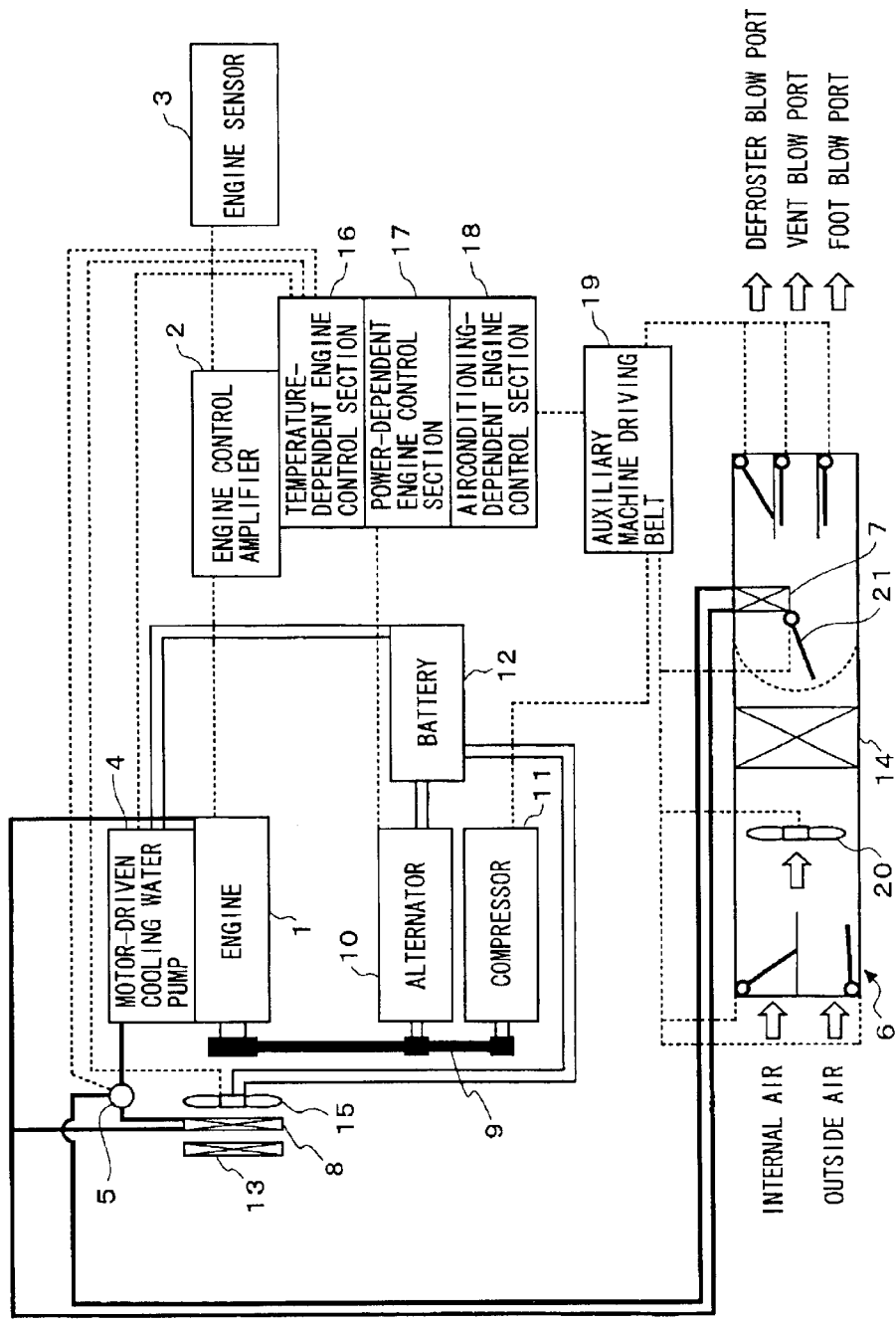
FIG. 1 is a whole system diagram showing a vehicle control system of a first embodiment.

FIG. 1 is a whole system diagram showing a vehicle control system of a first embodiment.

In the drawing, an engine control amplifier 2 is provided for an engine 1. This engine control amplifier 2 controls the engine 1 and an engine sensor 3 is provided for this engine control amplifier 2. The engine sensor 3 is, for example, an engine water temperature measuring sensor to measure the water temperature of the engine 1, an engine oil measuring sensor to measure the oil temperature of the engine 1, or the like. A motor-driven cooling water pump 4 is driven by an electric motor. A cooling water passes through an electronic control thermostat 5 and is sucked by the motor-driven cooling water pump 4 to be discharged to the engine 1. The cooling water flowing out of the engine 1 flows into a heater core 7 in an airconditioning unit 6 to return to the electronic control thermostat 5 again. Here, a water distribution amount to a radiator 8 is adjusted by the electronic control thermostat 5. The rotational force of the engine 1 drives an alternator 10 and an airconditioning compressor 11 via an auxiliary machine driving belt 9.

The alternator 10 generates an electric power by the driving force of the airconditioning compressor 11 to generate an electric energy for operating various electric systems, and further stores a surplus electric power in a battery 12.

The airconditioning compressor 11, which is omitted in order to avoid complicating the drawing, compresses a refrigerant, and this refrigerant is heat-exchanged with the atmosphere in a condenser 13 to cool the atmosphere, adiabatically expanded by a not-shown refrigerant expander, and introduced into an evaporator 14 in the airconditioning unit 6 to cool an airconditioning air. The radiator 8 is disposed adjacent to the condenser 13, and the refrigerant in the condenser 13 and the cooling water in the radiator 8 are heat-exchanged with the atmosphere by the cooling motor fan 15 to cool the atmosphere. The cooling water made to flow by the motor-driven cooling water pump 4 cools the engine 1, thereafter heats the airconditioning air in the heater core 7, is heat-exchanged with an oil of the engine 1 by a not-shown oil warmer, and returns again to the motor-driven cooling water pump 4 via the electronic control thermostat 5. This electronic control thermostat 5 performs flow rate adjustment for determining the distribution amount of the cooling water to the radiator 8.

The aforesaid engine control amplifier 2 has a temperature-dependent engine control section 16, a power-dependent engine control section 17, and an airconditioning-dependent engine control section 18 incorporated therein.

The temperature-dependent engine control section 16 controls the motor-driven cooling water pump 4, the cooling motor fan 15, the electronic control thermostat 5, and an oil flow rate control valve in order to adjust the water temperature of the engine 1.

The airconditioning-dependent engine control section 18 controls the airconditioning compressor 11 via an airconditioning control amplifier 19. As shown in the drawing, the airconditioning control amplifier 19 controls an airconditioning fan 20 and doors such as an air mix door 21 of the airconditioning unit 6.

The power-dependent engine control section 17 receives control information from the temperature-dependent engine control section 16 and the airconditioning-dependent engine control section 18 to control the alternator 10.

Based on information received from the temperature-dependent engine control section 16, the power-dependent engine control section 17, and the airconditioning-dependent engine control section 18, the engine control amplifier 2 calculates fuel consumption amounts by the respective control sections to calculate the resultant fuel consumption amount as the engine 1, to perform a control operation.

Incidentally, in this example, the electronic control thermostat 5 is adopted as a water distribution amount adjusting unit. A thermostat in a conventional method opens/closes a valve by utilizing a force caused by the changes in the expansion volume of a wax depending on the temperature, but the electronic control thermostat 5 is so structured that the opening degree thereof is controllable to an arbitrary value by heating control of the wax by an electric control means such as a small heater. Incidentally, an actuator such as an electric motor may be utilized instead of the wax. Further, a normal wax-type thermostat may be also utilized.

Next, the operation will be explained

Figure 2:
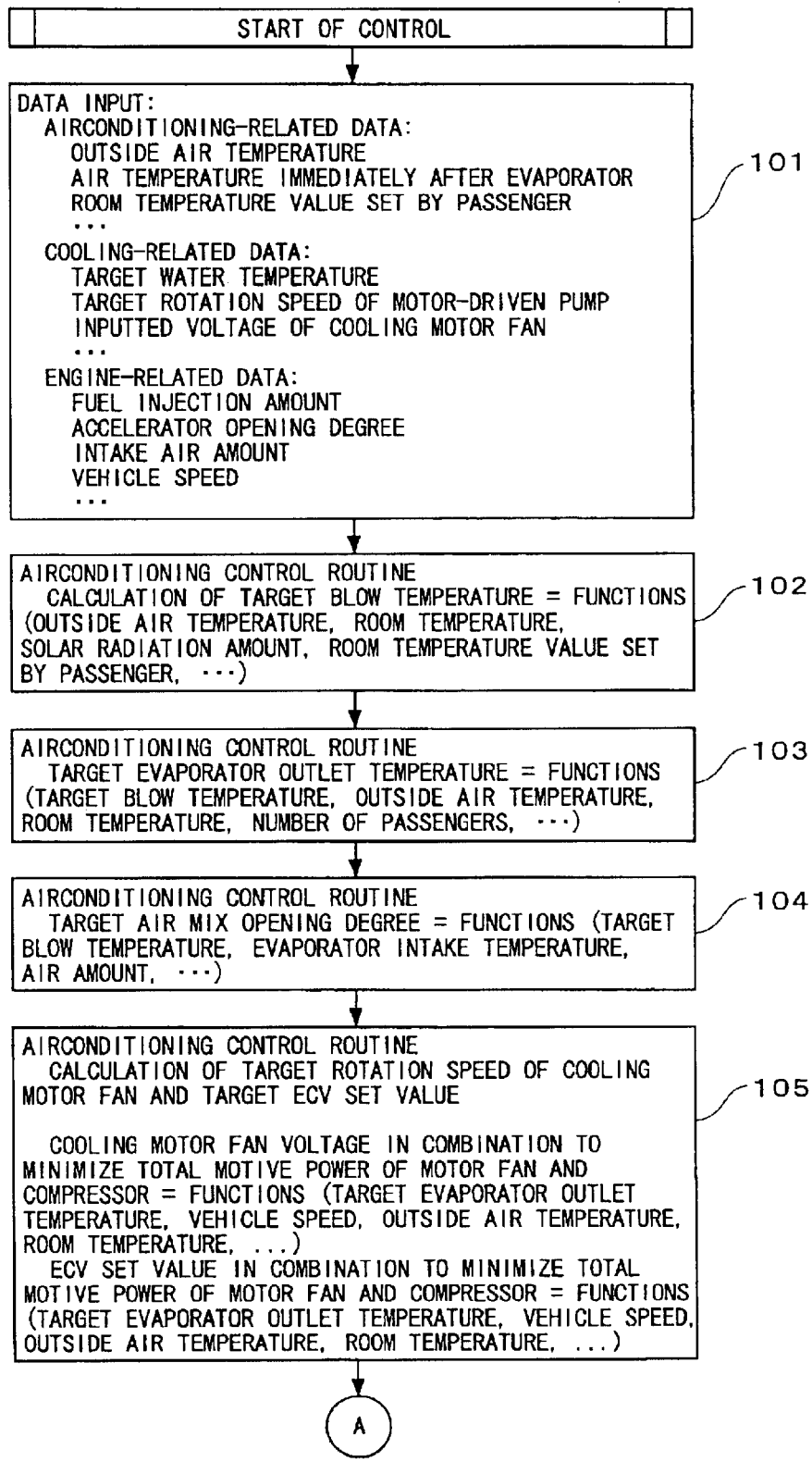
FIG. 2 is a flowchart showing the flow of engine control in an engine control amplifier 2 of the first embodiment.
Figure 3:
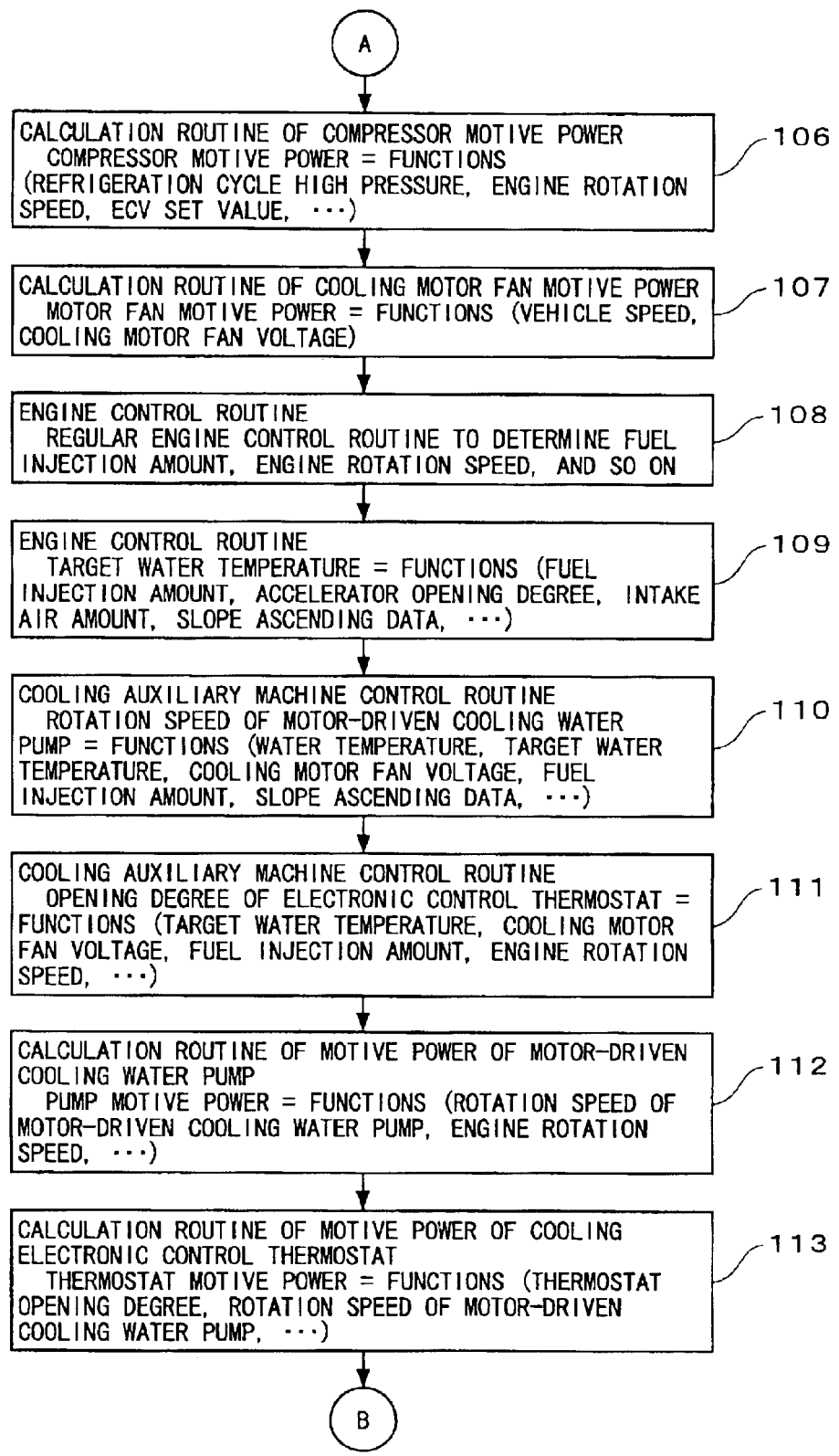
FIG. 3 is a flowchart showing the flow of the engine control in the engine control amplifier 2 of the first embodiment.
Figure 4:
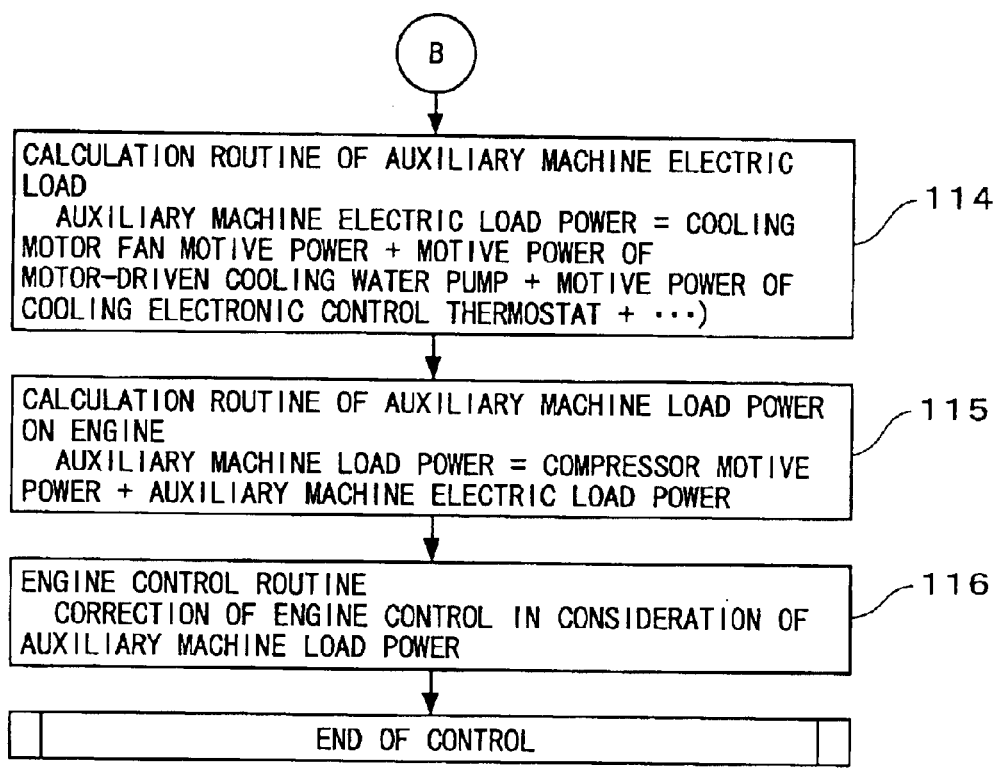
FIG. 4 is a flowchart showing the flow of the engine control in the engine control amplifier 2 of the first embodiment.

FIG. 2 to FIG. 4 are flowcharts showing the flow of engine control in the engine control amplifier 2 of the first embodiment, and this flow corresponds to the control operation in which an object to be controlled involved in two of the engine control sections is controlled prior to other objects to be controlled.

In Step 101, airconditioning-related data, cooling-related data, and engine-related data are inputted.

In Step 102, a target blow temperature of an airconditioning air is calculated based on outside temperature, room temperature, the amount of solar radiation, and so on.

In Step 103, a target evaporator outlet temperature (air temperature) is calculated based on the target blow temperature and so on.

In Step 104, a target air mix opening degree is calculated based on the target blow temperature and so on.

Figure 5:
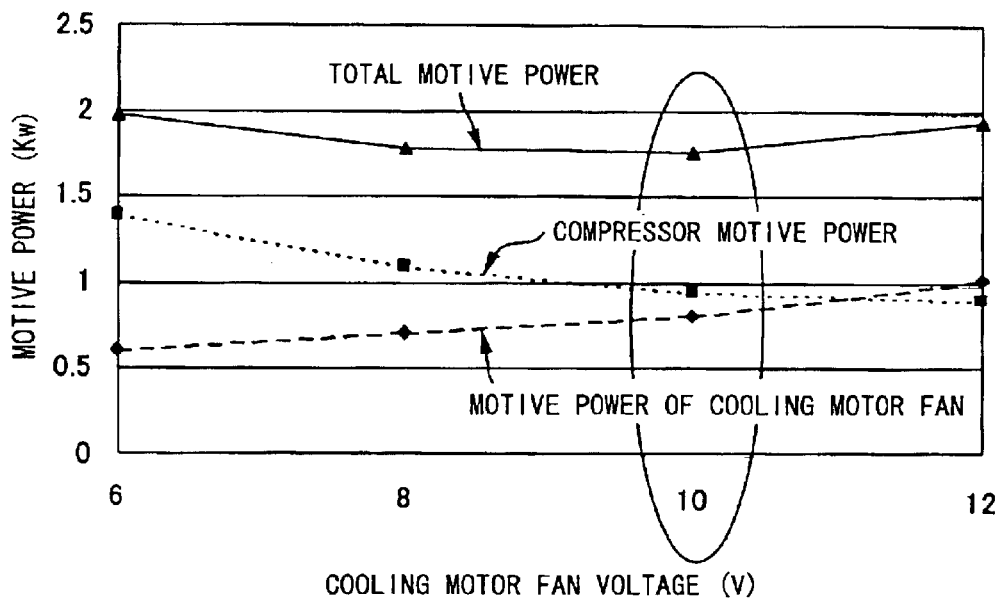
FIG. 5 is a chart showing the correlation between the voltage of a cooling motor fan and the motive power of an airconditioning compressor.
Figure 6:
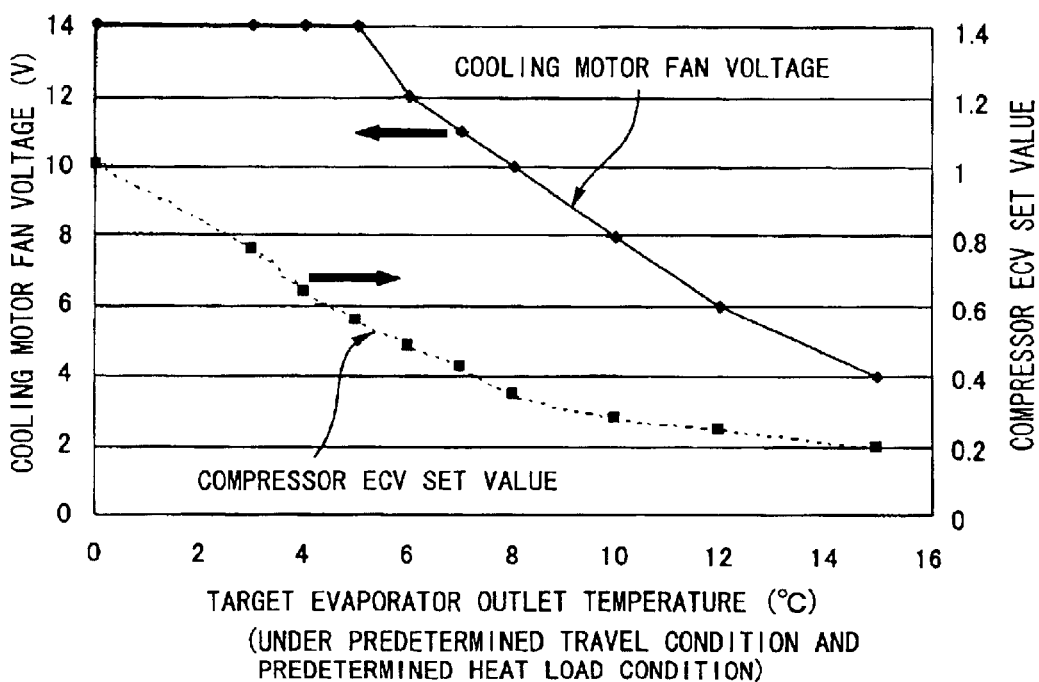
FIG. 6 is a chart showing the correlation between a target evaporator outlet temperature and the cooling motor fan voltage.

FIG. 5 shows control lines of an ECV of the airconditioning compressor 11 relative to voltage variation of the cooling motor fan 15 with the necessary target evaporator outlet temperature being kept constant. Here, the ECV is an externally controllable valve for controlling a refrigerant flow rate per one rotation of the airconditioning compressor 11. As shown in the drawing, a plurality of combinations of a cooling motor fan voltage and a compressor motive power determined by setting the airconditioning compressor ECV are possible for obtaining the same cooling capability. There is a combination thereamong that minimizes the total load power, in other words, the sum of an alternator load power determined by setting the motor fan voltage and the load power for driving the compressor 11. Examples of the compressor ECV set value and the cooling motor fan voltage to be set for each target evaporator outlet temperature based on this combination are shown in FIG. 6. Note that the values in these two drawings are anathematized or mapped for use since they vary depending on vehicle travel conditions, airconditioning set conditions, the heat load condition of the outside air, and so on.

In Step 105, the cooling motor fan voltage and the airconditioning compressor ECV set value to constitute the combination that minimizes the total motive power of the cooling motor fan 15 and the airconditioning compressor 11 are calculated based on this drawing.

In Step 106, the motive power of the airconditioning compressor 11 is calculated based on a high pressure of a refrigeration cycle system, an engine rotation speed, the ECV set value, and so on.

In Step 107, the motive power of the cooling motor fan 15 is calculated based on the vehicle speed and the cooling motor fan voltage.

In Step 108, regular engine control to determine a fuel injection amount, the engine rotation speed, and so on is conducted.

In Step 109, a target water temperature is calculated based on the fuel injection amount, an accelerator opening degree, an intake air amount, and so on.

Figure 7:
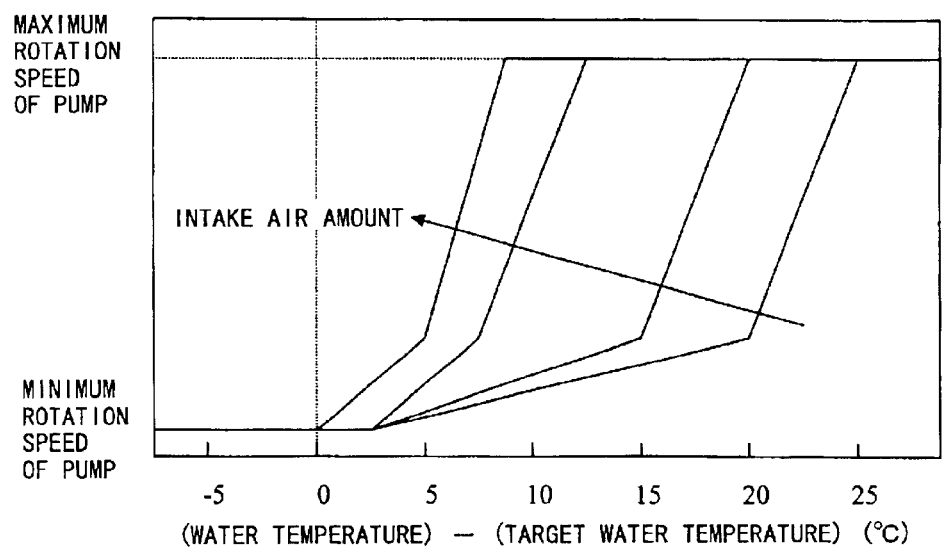
FIG. 7 is a chart showing the correlation between water temperature deviation and the rotation speed of a pump.

In Step 110, the rotation speed of the motor-driven cooling water pump 4 is calculated based on the target water temperature, the water temperature, the fuel injection amount, and so on. To be more specific, as shown in FIG. 7, the rotation speed of the motor-driven cooling water pump 4 is set according to the deviation of the water temperature from the target water temperature and according to the intake air amount. Specifically, a pump rotation speed is set closer to a maximum rotation speed side as the deviation is larger. Consequently, a pump flow rate is increased to realize quicker cooling as the deviation is larger, so that the water temperature can be made closer to the set target water temperature. Further, the pump rotation speed is set closer to the maximum rotation speed side as the intake air amount is larger, which makes it possible to increase the cooling capability when the load on the engine 1 is high.

Note that a halt state or a predetermined low rotation speed, for example, 250 rpm or the like is defined as the minimum rotation speed of the pump as shown in the drawing. Possible reasons why the low rotation speed instead of the halt state is set as the minimum rotation speed are to enhance the accuracy of the temperature measurement, to avoid a local boiling phenomenon of the engine 1, and so on by supplying water of a cooling system constantly to the water temperature sensor for the cooling water. Alternatively, when the pump minimum rotation speed cannot be set to a sufficiently low value, it is also suitable that the operation and the halt state of the motor-driven cooling water pump 4 are alternately repeated and the water temperature is measured while the motor-driven cooling water pump 4 is in operation. Incidentally, the frequency of repeating the operation and the halt of the motor-driven cooling water pump 4, an ON/OFF period, or the like may be appropriately set according to the engine water temperature, the intake air amount, or the like. For example, when the water temperature or the intake air amount is equal to or larger than a predetermined value, there is a possibility of a rapid increase in the water temperature. Therefore, in such a case, the ON time ratio in the ON/OFF ratio may be increased or only the operation state is kept without any halt state.

Figure 8:
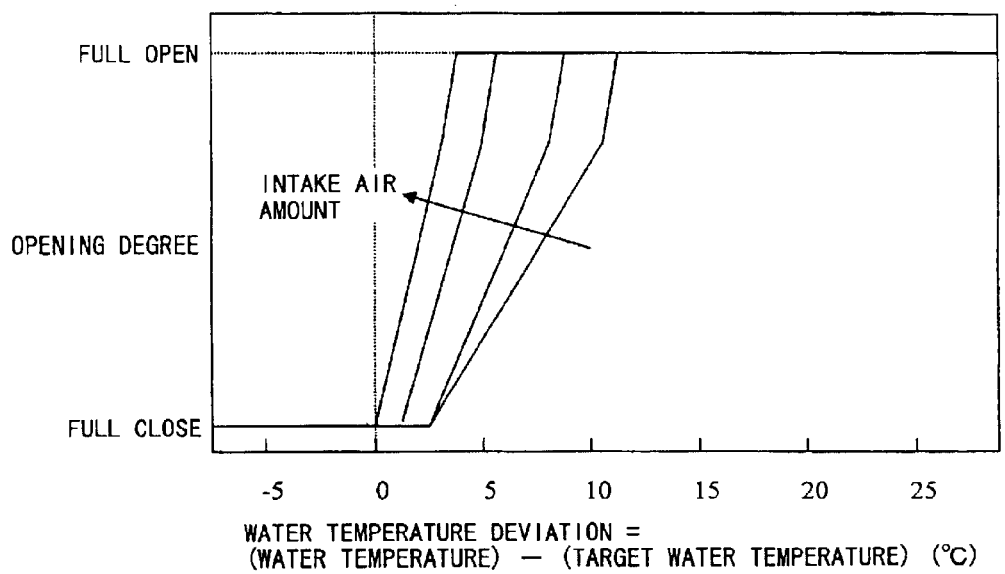
FIG. 8 is a chart showing the correlation between the water temperature deviation and the opening degree of an electronic control thermostat.

In Step 111, the opening degree of the electronic control thermostat 5 is calculated based on the target water temperature, the fuel injection amount, and so on. To be more specific, as shown in FIG. 8, the deviation of the water temperature from the target water temperature is calculated and the opening degree of the electronic control thermostat 5 is determined based on this deviation and the intake air amount. Specifically, the opening degree is set closer to a full open side as the deviation is larger to make the cooling water flow to the radiator 8, thereby cooling the cooling water rapidly. Further, the opening degree is set closer to the full open side as the intake air amount is larger. This is because the load on the engine 1 is high to easily cause a rapid increase in the temperature of the cooling water when the intake air amount is large, and the temperature of the cooling water of the engine 1 can be properly controlled by the full-open side setting.

In Step 112, the motive power of the motor-driven cooling water pump 4 is calculated based on the rotation speed of the motor-driven cooling water pump 4 and so on.

In Step 113, the motive power of the electronic control thermostat 5 is calculated based on the thermostat opening degree, the motor-driven cooling water pump rotation speed, and so on.

In Step 114, the electric load power of the auxiliary machines is calculated based on the cooling motor fan motive power, the motor-driven cooling water pump motive power, the electronic control thermostat motive power, and so on which are calculated above.

In Step 115, the airconditioning compressor motive power and the electric load power of the auxiliary machines are added to derive the power load of the auxiliary machines onto the engine 1.

In Step 116, the engine controls which are set in Steps 108, 109 are corrected in consideration of the load power of the auxiliary machines.

Next, the effects will be explained.

In the vehicle control system in the first embodiment, the following effects are obtainable.

The load power onto the engine 1 given by the auxiliary machines such as the cooling motor fan 15, the motor-driven cooling water pump 4, the electronic control thermostat 5, and so on is calculated and the engine control is corrected in consideration of this load power of the auxiliary machines, so that the optimum control of the fuel consumption amount of the engine 1 can be performed in addition to the regular engine control while the cooling motor fan 15, the water or oil temperature of the engine 1, and the respective states of airconditioning and power generation are controlled. Consequently, the total engine load which is expressed by the sum total of the loads on the engine given by the auxiliary machines can be controlled to be low, so that improvement in fuel efficiency which is dependent on the total engine load can be achieved.

Since the electronic control thermostat 5 that adjusts the water distribution amount to the radiator 8 and the motor-driven cooling water pump 4 that transfers the cooling water are controlled, the temperature of the engine cooling water can be appropriately set.

It is possible to carry out a control operation that optimizes (minimizes) the load power of the airconditioning compressor 11 and the cooling motor fan 15 while a certain level of cooling capability is maintained, by controlling the combination of the airconditioning compressor 11 and the cooling motor fan 15 whose capacity and rotation speed are controllable by external signals respectively.

Since the electronic control thermostat 5 is used in order to properly adjust the temperature of the cooling water of the engine 1 based on the motor fan control which is determined by the airconditioning control, it is possible to realize further improvement in fuel efficiency.

Second Embodiment

First, the configuration will be explained.

Figure 9:
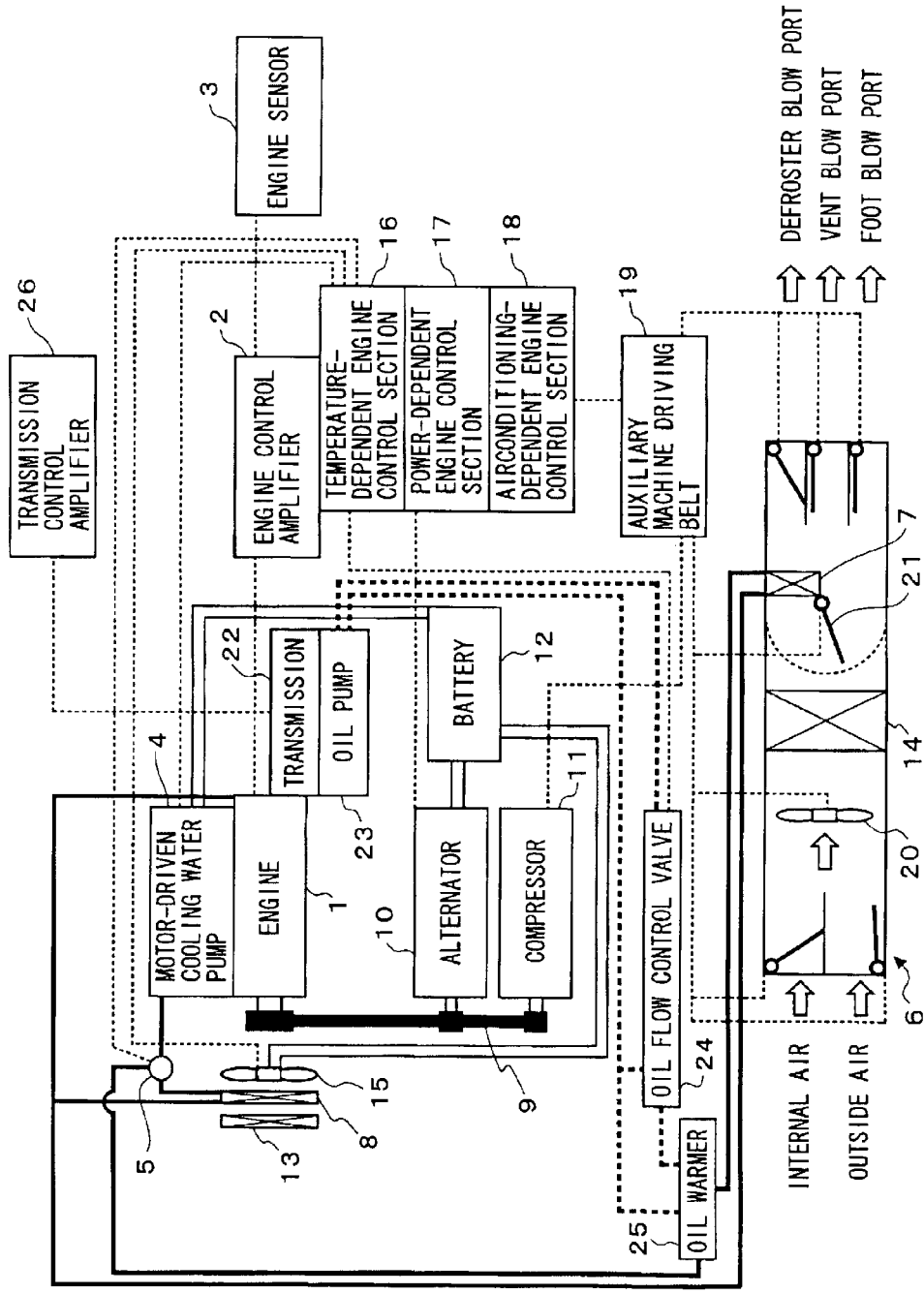
FIG. 9 is a whole system diagram showing a vehicle control system of a second embodiment.

FIG. 9 is a whole system diagram showing a vehicle control system of a second embodiment. Note that the configuration of the second embodiment is substantially the same as that of the first embodiment which is explained using FIG. 1, and therefore only what is different will be explained.

An oil pump 23, which is provided for a transmission 22, is driven by the rotational force of the transmission 22. An engine oil made to flow by this oil pump 23 flows via an oil flow rate control valve 24, by which a distribution amount the engine oil to pass through an oil warmer 25 is adjusted.

A temperature-dependent engine control section 17 controls this oil flow rate control valve 24. Note that the oil warmer 25 is added in a cooling water passage, and a cooling water which has passed through a heater core 7 of an airconditioning unit 6 flows into an electronic control thermostat 5 via the oil warmer 25.

A transmission control amplifier 26 is provided for the transmission 22, and this transmission control amplifier 26 controls the transmission 22. The transmission control amplifier 26 also communicates with an engine control amplifier 2.

In this embodiment, a temperature sensor, which is not shown in the drawing, detects the temperature of a transmission oil, and based on this data, the temperature-dependent engine control section 16 controls an oil flow rate control valve 24 in order to make the temperature of the transmission oil proper.

Next, the operation will be explained.

Figure 10:
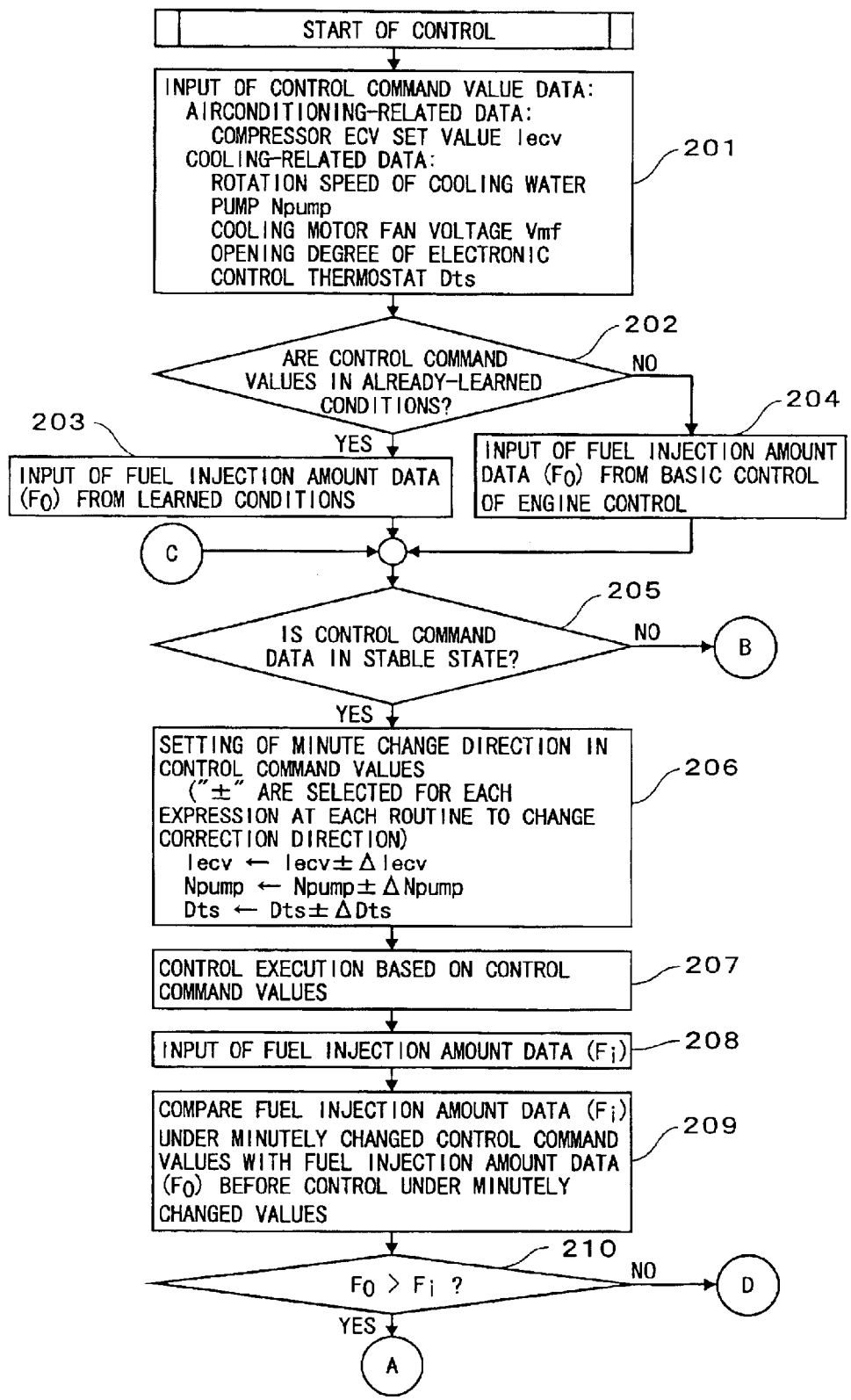
FIG. 10 is a flowchart showing the flow of engine control in an engine control amplifier 2 of the second embodiment.
Figure 11:
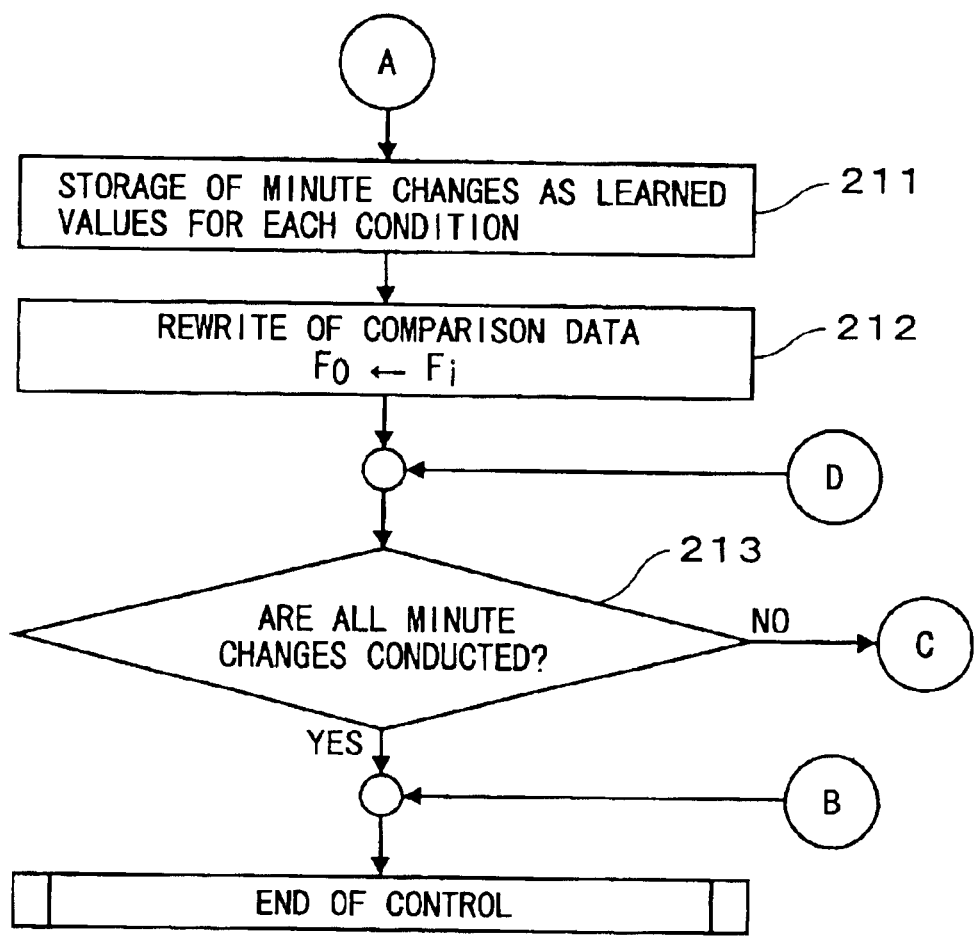
FIG. 11 is a flowchart showing the flow of the engine control in the engine control amplifier 2 of the second embodiment.

FIG. 10 and FIG. 11 are flowcharts showing the flow of engine control in the engine control amplifier 2 of the second embodiment.

In Step 201, data of control command values are inputted. Specifically, an ECV set value Iecv which determines capacity control of an airconditioning compressor 11 is inputted as airconditioning-related data, and a cooling water pump rotation speed Npump, a cooling motor fan voltage Vmf, and an electronic control thermostat opening degree Dts are subsequently inputted as cooling-related data.

In Step 202, it is judged whether or not the condition of the control command values exists in the conditions already learned. For example, the condition is divided into divisional ranges, for example, a range in which the cooling water pump rotation speed Npump is 2,100 rpm to 2,300 rpm and the cooling motor fan voltage Vmf is 8 V to 8.7 V, and so on, and it is judged whether or not the control command values correspond to any one of the condition ranges. When the control command values correspond to any one of the condition ranges already learned, the control proceeds to Step 203 while proceeding to Step 204 when they do not correspond to any one of the condition ranges.

In Step 203, fuel injection amount data $F_0$ under the already learned condition is used as a comparison basis.

In Step 204, fuel injection amount data $F_0$ in original basic engine control is used as data as the comparison basis.

In Step 205, it is judged whether or not the control command values are data in a stable state. When they are the data in the stable state, the control proceeds to Step 206 while this control is finished when they are not the data in the stable state.

In Step 206, the control command values are changed only minutely. Specifically, as shown in the drawing, the addition and the subtraction of minute control correction amounts, for example, $\Delta$Iecv in the case of the ECV set value Iecv of the airconditioning compressor 11, are selected for each of the control command values. Then, all the combinations of the control command values resulting from the addition and the subtraction of the correction amounts are made.

In Step 207, the controls over an engine 1 and auxiliary machines are carried out based on the prepared combinations of the control command values. At this time, the fuel injection amount varies since the travel condition is kept unchanged from the travel condition prior to the control.

In Step 208, data $F_i$ of the resultant fuel injection amounts are inputted.

In Step 210, the data $F_i$ of the fuel injection amounts after the slightly changed controls are compared with the fuel injection amount $F_0$ before this control, and the control proceeds to Step 211 when the fuel injection amount $F_i$ after this control is smaller, while proceeding to Step 213 when the fuel injection amount $F_0$ before this control is smaller.

In Step 211, optimum correction amounts under this condition are learned as newly learned values. This means that the correction amounts are stored for each condition.

In Step 212, the comparison data are rewritten until the minute changes in all the combinations are completed.

In Step 213, it is confirmed whether or not the minute changes in all the combinations are carried out. When the minute changes in all the combinations have been carried out, this control is finished. But, when the minute changes in all the combinations have not been completed, the control returns to Step 205 and the above-described controls are repeated until the minute changes in all the combinations are completed.

Next, the effects will be explained.

In the vehicle control system in the second embodiment, the effects stated below are obtainable.

Since the control command values are corrected based on a pre-programmed control for the purpose of finding the optimum control command values, it is possible to probe a more optimum direction, namely, a control direction causing the reduction in the fuel consumption amount, which makes it possible to realize further improvement in fuel efficiency.

The correction amounts of the control command values in the control direction causing the reduction in the fuel consumption amount are stored for each condition, thereby realizing the reutilization of the stored correction amounts, which enables the probe for a better correction direction to realize improvement in fuel efficiency.

Third Embodiment

First, the configuration will be explained.

Figure 12:
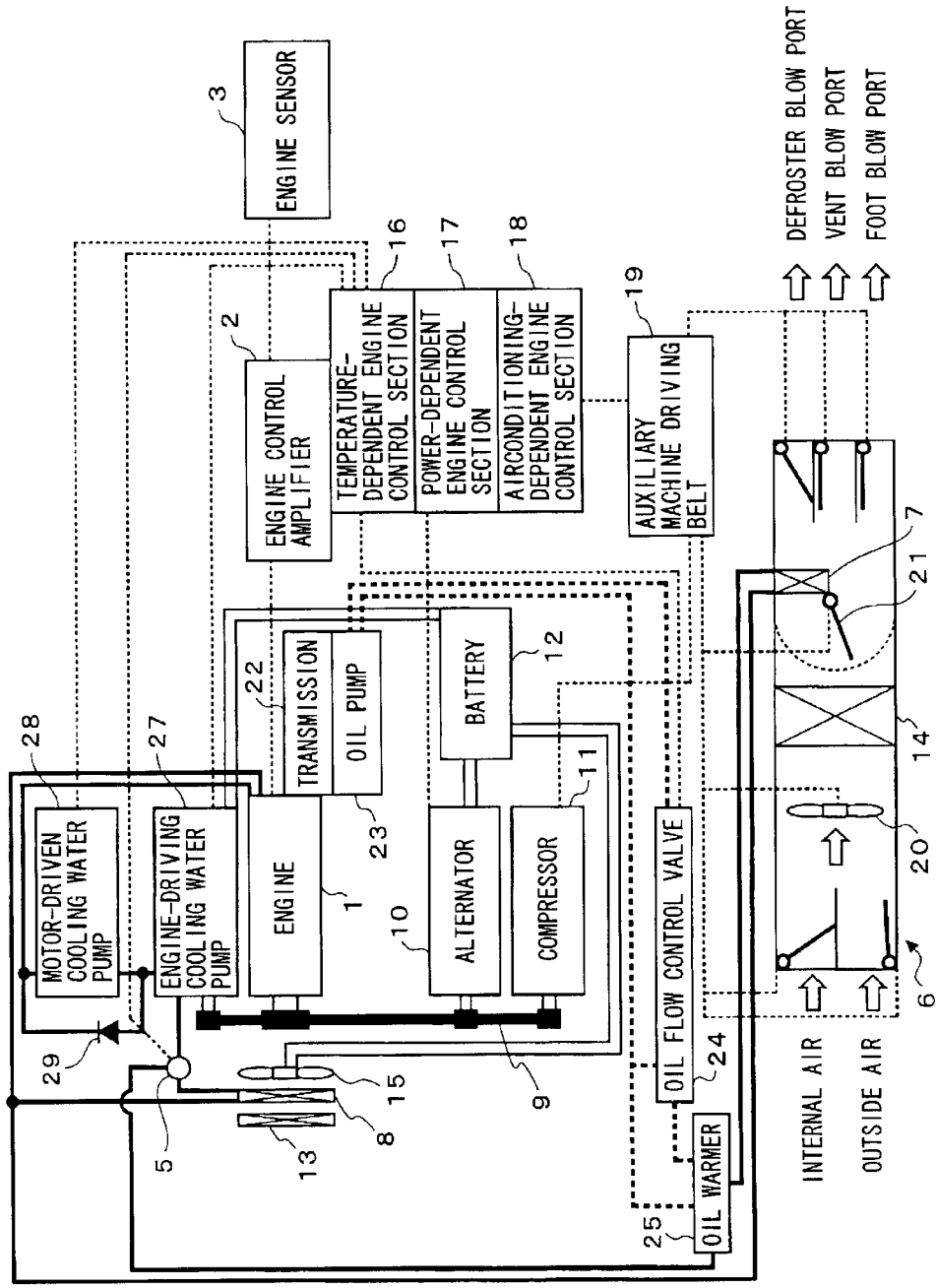
FIG. 12 is a whole system diagram showing a vehicle control system of a third embodiment.

FIG. 12 is a whole system diagram showing a vehicle control system of a third embodiment. As shown in the drawing, the third embodiment is different from the second embodiment in that two kinds of pumps, namely, a pump for driving an engine (an engine-driving cooling water pump 27) and a motor-driven pump (a motor-driven cooling water pump 28) are used. The other configuration is the same as that of the second embodiment, and therefore, the explanation thereof will be omitted.

Next, the operation will be explained.

A cooling water flowing out of an electronic control thermostat 5 is sucked by the engine-driving cooling water pump 27 to flow into the motor-driven cooling water pump 28. Here, when the motor-driven cooling water pump 28 is in non-operation, the cooling water flows into an engine 1 via a check valve 29, not passing through the motor-driven cooling water pump 28.

Next, the effects will be explained.

In the vehicle control system of the third embodiment, two kinds of the pumps, namely, the engine-driving cooling water pump 27 and the motor-driven cooling water pump 28 are used, so that the use of the engine-driving cooling water pump 27 allows a vehicle to run with a load equal to or lower than a predetermined load even if the motor-driven cooling water pump 28 should be halted. Further, the use of the motor-driven cooling water pump 28 in addition to the engine-driving cooling water pump 27 enables the adjustment of the motive power of the motor-driven cooling water pump 28 through electrical control.

Therefore, compared with the case when the motor-driven cooling water pump 28 is not used, the motive power of the cooling water pump can be reduced to realize fuel saving.

Fourth Embodiment

The configuration of a fourth embodiment is the same as that of the first embodiment and therefore, the explanation thereof will be omitted.

Next, the operation will be explained.

Figure 13:
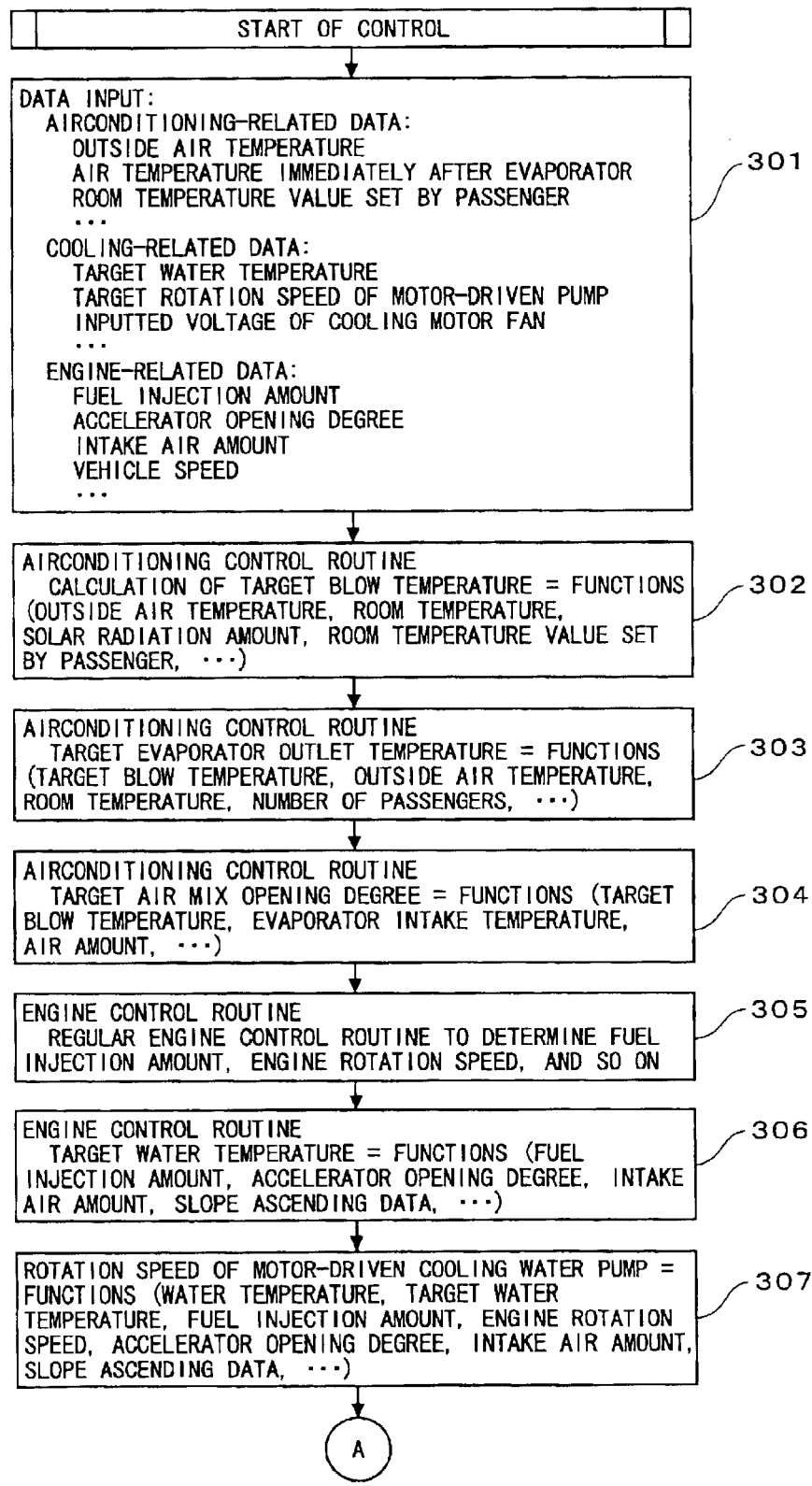
FIG. 13 is a flowchart showing the flow of engine control in an engine control amplifier 2 of a fourth embodiment.
Figure 14:
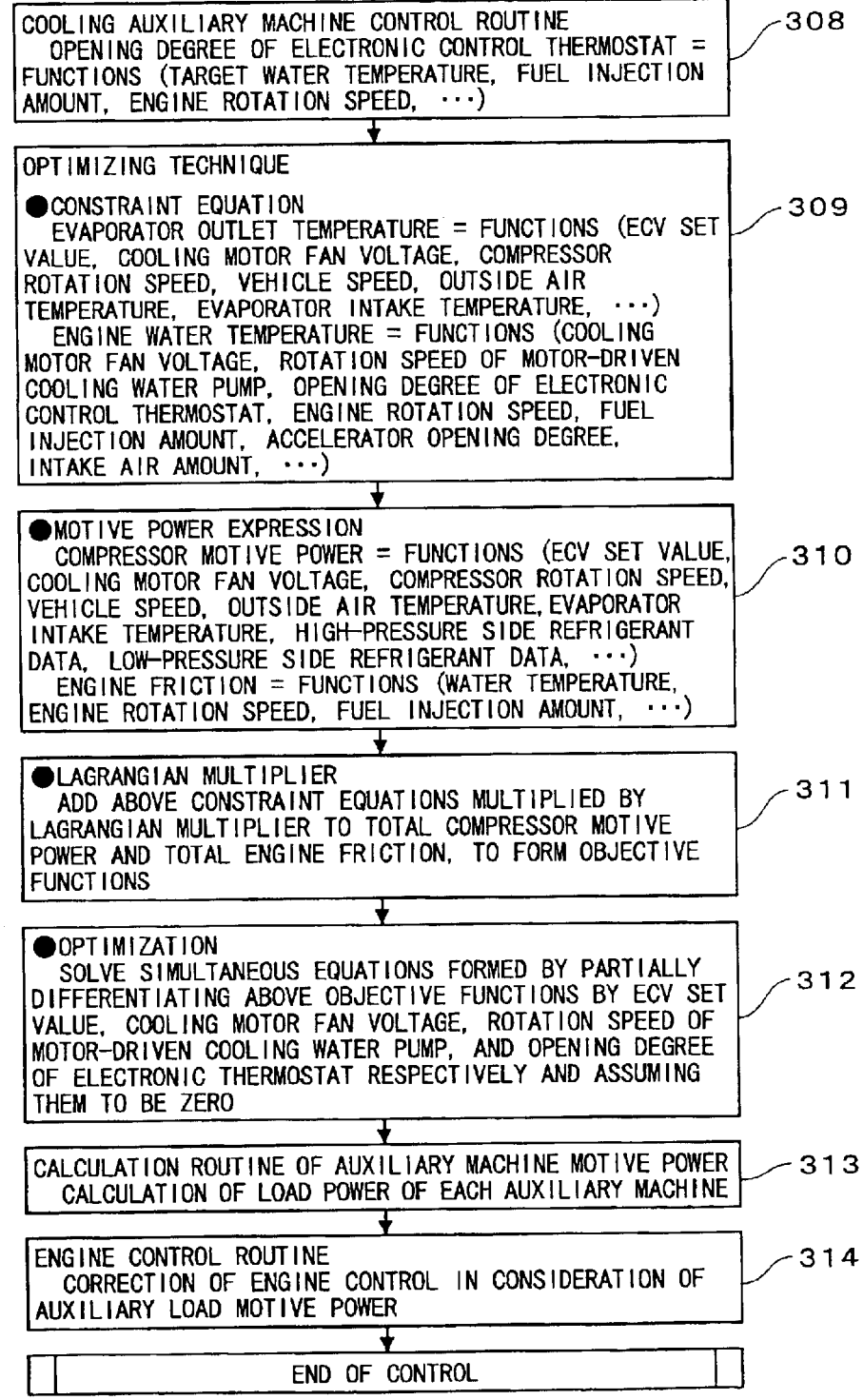
FIG. 14 is a flowchart showing the flow of the engine control in the engine control amplifier 2 of the fourth embodiment.

FIG. 13 and FIG. 14 are flowcharts showing the flow of engine control in an engine control amplifier 2 of the fourth embodiment. Note that only what is different from the flowchart shown in FIG. 2 will be explained.

In Step 309, constraint equations as an optimizing technique are formed. In the constraint equations, an evaporator outlet temperature is represented by an expression in which an ECV set value and so on are defined as arguments and an engine water temperature is represented by an expression in which a cooling motor fan voltage and so on are defined as arguments. At this time, target values obtained in the latest control routine are inserted as the evaporator outlet temperature and the engine water temperature respectively.

In Step 310, as motive power expressions, a compressor motive power is represented by an expression in which the ECV set value and so on are defined as functions, and further engine friction is represented by an expression in which the water temperature and so on are defined as functions.

In Step 311, the aforesaid constraint equations are turned into the form of "equality=0 (zero)" to be substituted in the aforesaid compressor motive power expression and engine friction expression, thereby forming objective functions. This manipulation is mathematically called the Lagrangian multiplier method.

In Step 312, the objective functions are partially differentiated by the ECV set value and so on and they are assumed to be 0 (zero) respectively, so that simultaneous equations are formed. Then, the simultaneous equations are solved, so that it is possible to set the evaporator outlet temperature and the engine water temperature to the target values, and further to determine control values of auxiliary machines that can minimize a fuel consumption amount. The optimum solution finding method by the Lagrangian multiplier method and the partial differentiation manipulation is selected here, but it is indicated in mathematical books that various methods can be selected. Further, the result of such a mathematical manipulation may be stored as a map, a list, or simpler mathematical expressions for utilization.

In Step 313, the load powers of the respective auxiliary machines are calculated.

Next, the effects will be explained.

In the vehicle control system of the fourth embodiment, the combination of the control values of the auxiliary machines that minimizes the fuel consumption amount of an engine 1 is derived by the optimizing technique to control the auxiliary machines, which makes it possible to realize fuel saving by reducing the load powers by the auxiliary machines.

Fifth Embodiment

The configuration of a fifth embodiment is the same as that of the first embodiment and therefore, the explanation thereof will be omitted.

Next, the operation will be explained.

Figure 15:
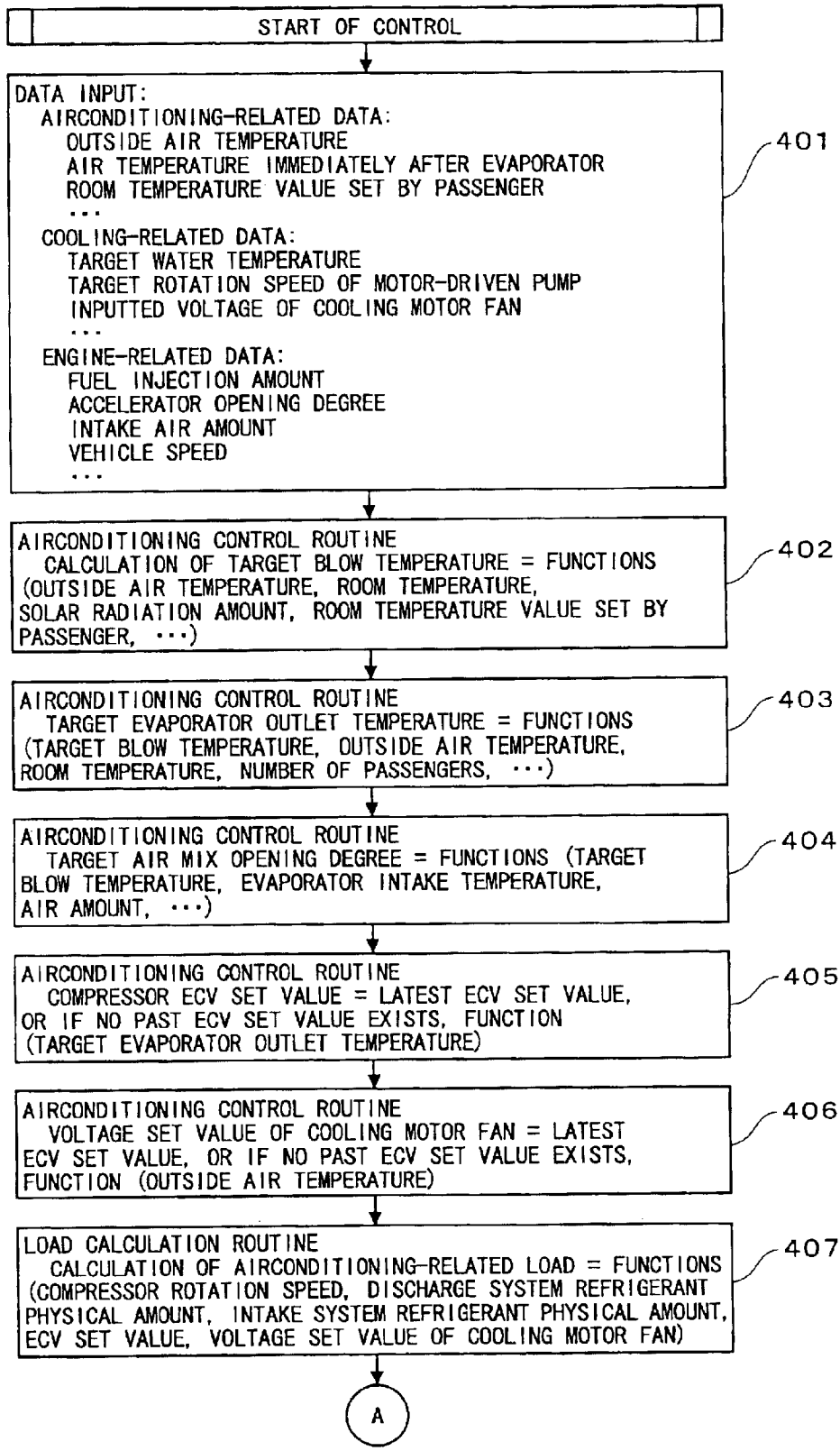
FIG. 15 is a flowchart showing the flow of engine control in an engine control amplifier 2 of a fifth embodiment.
Figure 17:
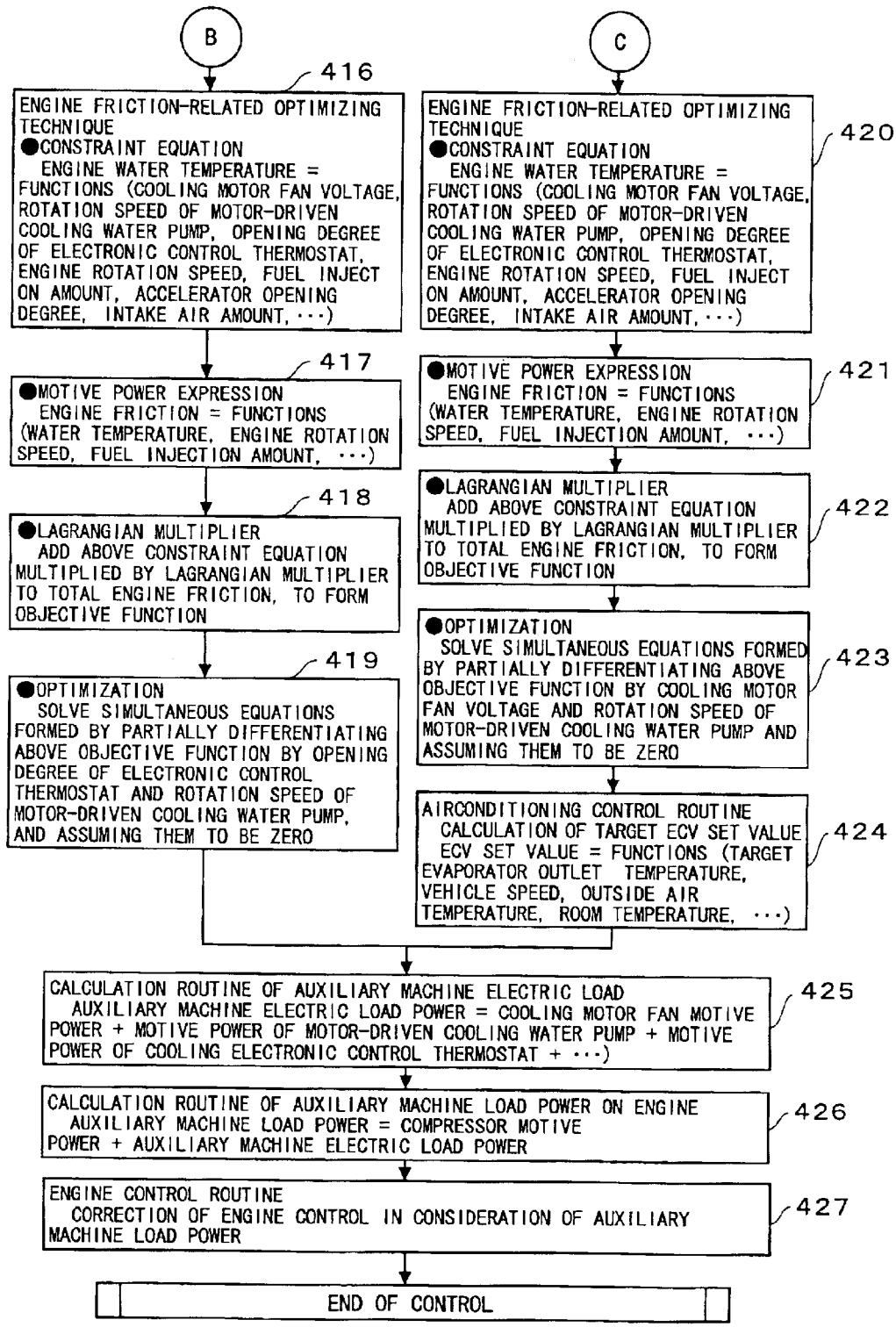
FIG. 17 is a flowchart showing the flow of the engine control in the engine control amplifier 2 of the fifth embodiment.

FIG. 15 to FIG. 17 are flowcharts showing the flow of engine control in an engine control amplifier 2 of the fifth embodiment. Note that only what is different from the flowchart shown in FIG. 2 will be explained.

In Step 413, an airconditioning-related load and an engine-friction-related load are calculated with rough accuracy and the control order is changed according to these loads.

When the airconditioning-related load is higher, the control proceeds to Step 414, where a target rotation speed of a cooling motor fan and a target ECV set value are calculated. Subsequently, in Step 416 to Step 419, the combination of controls over auxiliary machines that minimizes engine load is derived through the use of an optimizing technique.

Meanwhile, when the engine-friction-related load is higher, the control proceeds to Step 415, where the opening degree of an electronic control thermostat is calculated. Subsequently, in Step 420 to Step 423, the combination of the controls over the auxiliary machines that minimizes the engine load is derived through the use of the optimizing technique, and in Step 424, the target ECV set value is calculated.

Next, the effects will be explained.

In the vehicle control system of the fifth embodiment, an auxiliary machine giving more significant influence to the fuel consumption amount can be optimized without using the aforesaid mathematical technique as in the above-described fourth embodiment, which makes it possible to find the set values of control approximate to the optimum control that results in the minimum fuel consumption amount.

Sixth Embodiment

The configuration of a sixth embodiment is the same as that of the first embodiment and therefore, the explanation thereof will be omitted.

Next, the effects will be explained.

Figure 19:
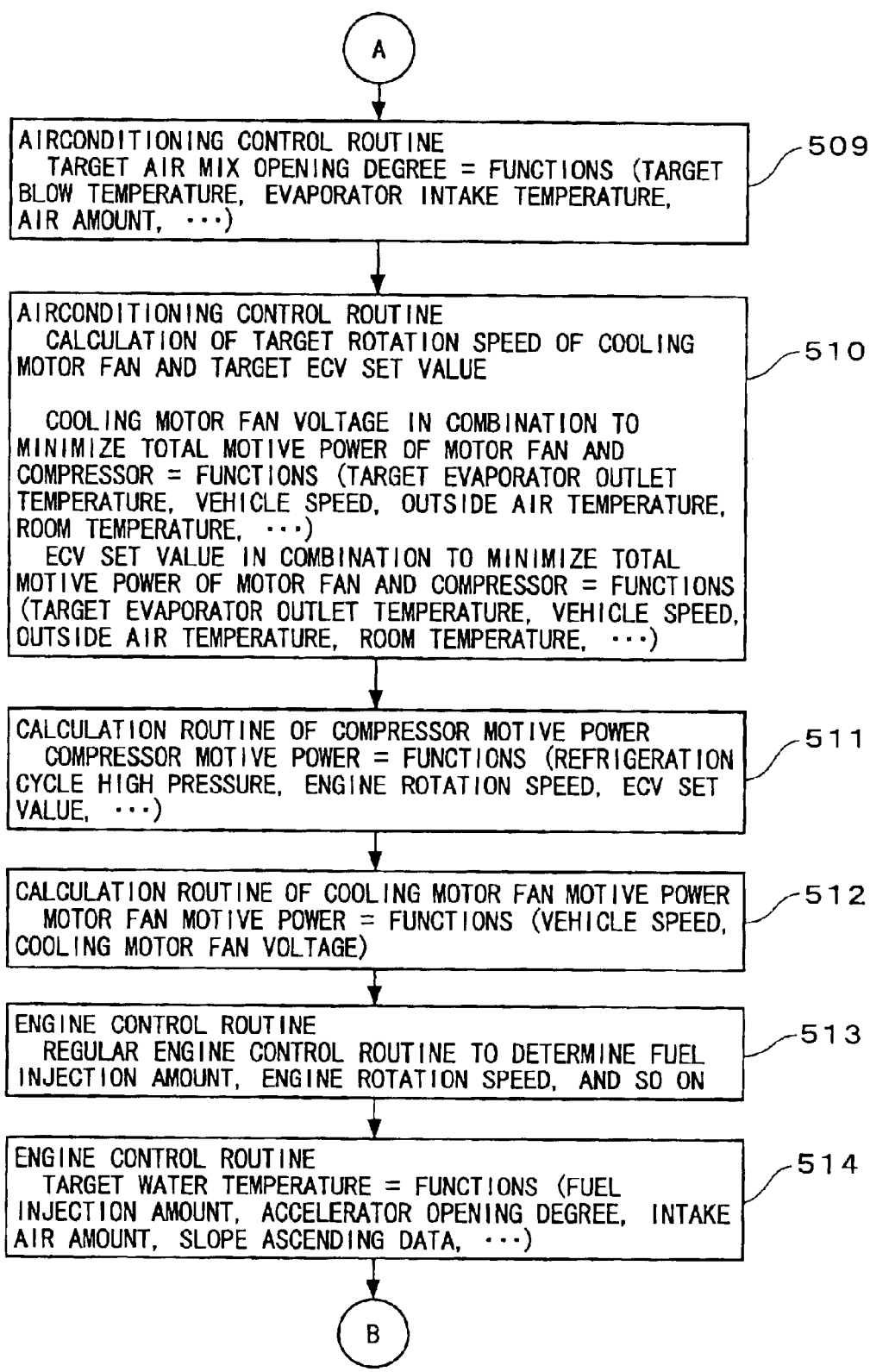
FIG. 19 is a flowchart showing the flow of the engine control in the engine control amplifier 2 of the sixth embodiment.
Figure 20:
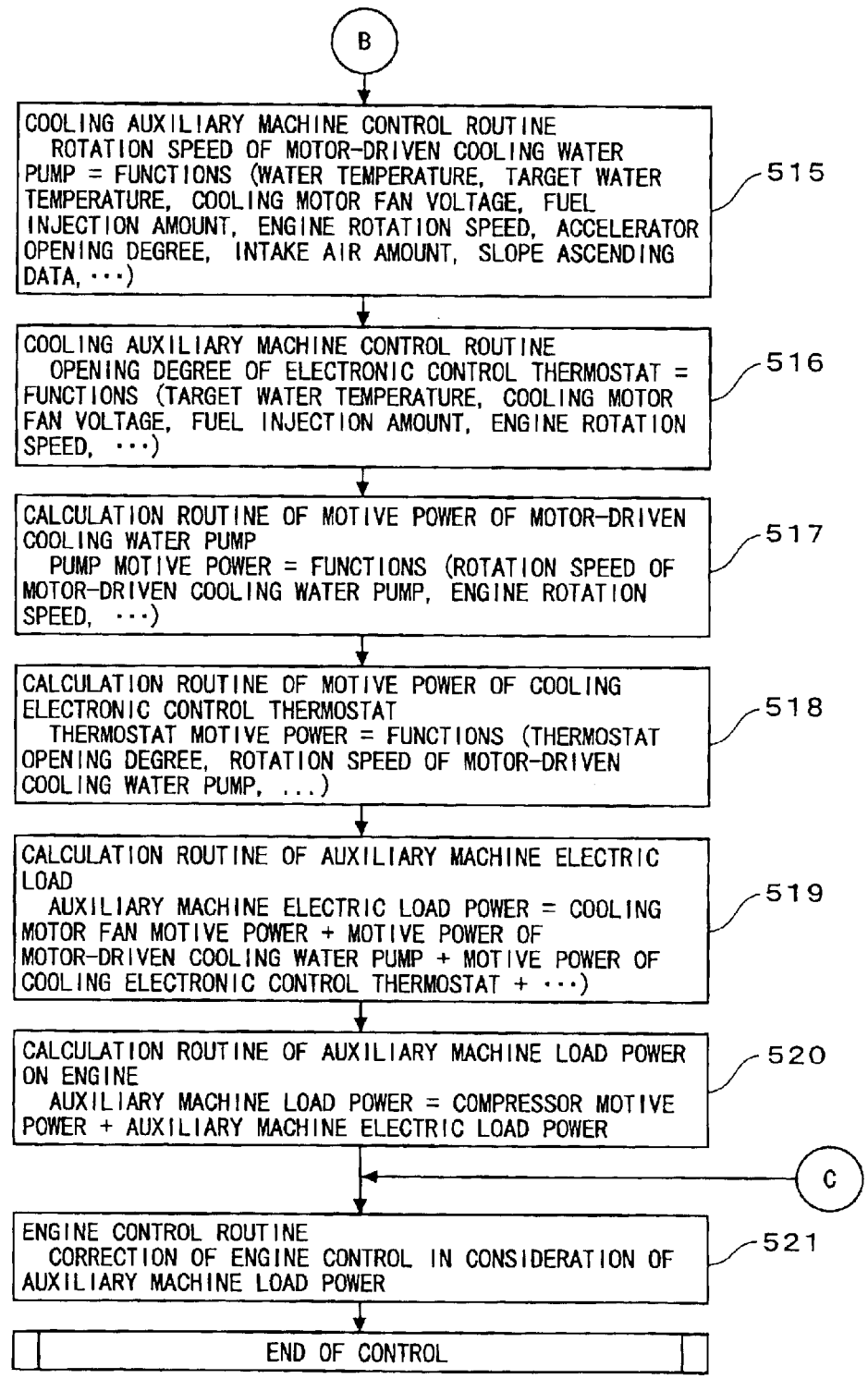
FIG. 20 is a flowchart showing the flow of the engine control in the engine control amplifier 2 of the sixth embodiment.

FIG. 18 to FIG. 20 are flowcharts showing the flow of engine control in an engine control amplifier 2 of the sixth embodiment. Note that only what is different from the flowchart shown in FIG. 2 will be explained.

In Step 502, it is judged whether or not an engine water temperature is equal to or lower than a predetermined value 1. When it is equal to or lower than the predetermined value 1, the control proceeds to Step 503, and regular control to minimize a fuel consumption amount is performed. Meanwhile, when it is higher than the predetermined value 1, the control proceeds to Step 505.

In Step 505, the engine water temperature is compared with a predetermined value 2 which is a temperature index value higher than the aforesaid predetermined value 1. When the engine water temperature is equal to or lower than the predetermined value 2, the control proceeds to Step 506 while proceeding to Step 507 when it is higher than the predetermined value 2.

In Step 506, such control is performed that a compressor ECV set value is minimized to reduce a compressor motive power, a cooling motor fan voltage is maximized, the rotation speed of a motor-driven cooling water pump 4 is maximized, and the opening degree of an electronic control thermostat 5 is maximized (the flow to a radiator side), thereby controlling auxiliary machines so as to reduce engine load by airconditioning and further to quickly lower the engine water temperature.

In Step 507, since the water temperature not equal to or lower than a predetermined value 2 indicates that the water temperature is abnormally high, the airconditioning compressor 11 is clutched off to be halted, in addition to performing the aforesaid control over the cooling system auxiliary machines, thereby realizing the reduction in the engine load and the decrease in the engine water temperature. Incidentally, the water temperature is compared with the predetermined value here, but a time change rate (time differential value) of the water temperature may be compared with a predetermined value, as is shown as an example.

In Step 508, the motive powers of the auxiliary machines are calculated.

Next, the effects will be explained.

In the vehicle control system of the sixth embodiment, it is possible to prevent the engine 1 from breaking due to abnormal increase in water temperature or oil temperature of the engine 1, so that auxiliary machine control that minimizes the fuel consumption amount in the state free from the possibility of the breakage of the engine 1 can be realized.

In the foregoing description, the vehicle control system of the present invention is explained based on the first to sixth embodiments, but it is to be understood that the concrete configuration of the present invention is not limited to those described in the first to sixth embodiments, and various changes, additions, and so on of the design may be made without departing from the spirit of the inventions according to the claims.

What is claimed is:

1. A vehicle control system, comprising:

an engine configured to drive a vehicle;

an alternator as an auxiliary machine of said engine, driven mainly by the engine;

an airconditioning compressor driven mainly by said engine and having a refrigerant discharge rate control unit capable of adjusting a refrigerant discharge rate per one rotation;

a cooling motor fan driven by an electric power generated by said alternator, including a motor having a motor rotation speed control unit capable of adjusting a rotation speed of the motor, and being configured to introduce an outside air mainly to an airconditioning heat exchanger and an engine cooling heat exchanger;

an engine cooling unit configured to adjust at least one of a water temperature and an oil temperature of said engine; and a control unit configured to control said engine and auxiliary machines, wherein said control unit includes an engine control section consisting of:

a temperature-dependent engine control section configured to control a fuel consumption amount of said engine based on at least one of the water temperature and the oil temperature of the engine;

a power-dependent engine control section configured to control the fuel consumption amount of said engine based on an electric power essentially consumed by said cooling motor fan in the vehicle; and an airconditioning-dependent engine control section configured to control the fuel consumption amount of said engine based on the refrigerant discharge rate of said airconditioning compressor, and wherein said control unit performs one of the following control operations:

to derive, by an optimizing technique, a combination of controls over the auxiliary machines that minimizes the fuel consumption amount of said engine, to control the auxiliary machines;

to control an object to be controlled involved in at least two engine control sections among the engine control sections, prior to other objects to be controlled, in order to minimize the fuel consumption amount of said engine; and to control the auxiliary machines in descending order to magnitude of motive power.

2. A vehicle control system, comprising:

an engine configured to drive a vehicle;

a transmission unit configured to transmit a motive power generated in said engine to a vehicle driving system by changing a rotation speed;

an alternator as an auxiliary machine of said engine, driven mainly by the engine;

an airconditioning compressor driven mainly by said engine and having a refrigerant discharge rate control unit capable of adjusting a refrigerant discharge rate per one rotation;

a cooling motor fan driven by an electric power generated by said alternator, including a motor having a motor rotation speed control unit capable of adjusting a rotation speed of the motor, and being configured to introduce an outside air mainly to an airconditioning heat exchanger and an engine cooling heat exchanger;

an engine cooling unit configured to adjust at least one of a water temperature and an oil temperature of said engine;

a transmission unit oil temperature adjusting unit configured to adjust an oil temperature of said transmission unit; and a control unit configured to control said engine and auxiliary machines, wherein said control unit includes an engine control section consisting of:

a temperature-dependent engine control section configured to control a fuel consumption amount of said engine based on at least one of the water temperature of said engine, the oil temperature of said engine, and the oil temperature of said transmission unit;

a power-dependent engine control section configured to control the fuel consumption amount of said engine based on an electric power mainly consumed by said cooling motor fan in the vehicle; and an airconditioning-dependent engine control section for controlling the fuel consumption amount of said engine based on the refrigerant discharge rate of said airconditioning compressor, and wherein said control unit performs one of the following control operations:

to derive, by an optimizing technique, a combination of controls over the auxiliary machines that minimizes the fuel consumption amount of said engine, to control the auxiliary machines;

to control an object to be controlled involved in at least two engine control sections among the engine control sections, prior to other objects to be controlled, in order to minimize the fuel consumption amount of said engine; and to control the auxiliary machines in descending order of magnitude of motive power.

3. A vehicle control system according to claim 1, wherein said control unit sets, as the optimizing technique, relational expressions between control amounts of the auxiliary machines and the fuel consumption amount of the engine, and derives a combination of optimum values that minimizes the fuel consumption amount based on the plural relational expressions by a mathematical technique such as an extremum finding algorithm or linear programming.

4. A vehicle control system according to claim 1, wherein said control unit sets said cooling motor fan as the object to be controlled, in the control operation in which the object to be controlled involved in at least two engine control sections among the engine control sections is controlled prior to the other objects to be controlled in order to optimize the fuel consumption amount of said engine.

5. A vehicle control system according to claim 1, wherein, in the control operation in which the object to be controlled involved in at least two engine control sections among the engine control sections is controlled prior to the other objects to be controlled in order to minimize the fuel consumption amount of said engine or in the control operation in which the auxiliary machines are controlled in the descending order of the magnitude of the motive power, said control section controls at least one of said engine cooling unit and said transmission unit oil temperature adjusting unit prior to other objects to be controlled regardless of the control priority order when any one of the water temperature of said engine, the oil temperature of said engine, and the oil temperature of said transmission unit is equal to or higher than a set temperature, the control being performed so as to reduce the water temperature of said engine, the oil temperature of said engine, or the oil temperature of said transmission unit to a lower value than the set temperature.

6. A vehicle control system according to claim 1, wherein said engine cooling unit includes:

a radiator configured to heat-exchange a cooling water with the outside air;

a cooling water passage through which the cooling water circulates between the radiator and said engine;

a water distribution amount adjusting unit configured to adjust a water distribution amount to the radiator; and a cooling water pump unit configured to adjust a circulated water amount of the cooling water.

7. A vehicle control system according to claim 1, further comprising:

an airconditioning unit including an airconditioning refrigeration cycle;

an airconditioner setting unit through which a passenger makes a setting; and an airconditioning control unit configured to control said airconditioning unit based on said airconditioner setting unit, wherein said airconditioning-dependent engine control section controls the refrigerant discharge rate of said airconditioning compressor and a rotation speed of said cooling motor fan via said airconditioning control unit, and while performing a control to minimize a total motive power of said airconditioning compressor and said cooling motor fan, the airconditioning-dependent engine control section controls said engine cooling unit according to a set condition of said cooling motor fan which is selected in the control to minimize the total motive power.

8. A vehicle control system according to claim 1, wherein said control unit controls said water distribution amount adjusting unit and said cooling water pump unit based on the set condition of said cooling motor fan and a target engine water temperature to make the water temperature of said engine equal to the target engine water temperature.

9. A vehicle control system according to claim 1, wherein said control unit varies control command values of the auxiliary machines including said airconditioning compressor to minimize a total load power of said alternator and said airconditioning compressor applied onto said engine, examines a change in the total load power, and automatically probes in which direction the control commands should be varied in order to minimize the total load power.

10. A vehicle control system according to claim 9, wherein said control unit stores a result of the probe regarding in which direction the control command values of the auxiliary machines should be varied in order to minimize the total load power, according to a use condition of at least one of the auxiliary machines and said engine, and controls the auxiliary machines based on the stored contents.

11. A vehicle control system according to claim 2, wherein said control unit sets, as the optimizing technique, relational expressions between control amounts of the auxiliary machines and the fuel consumption amount of the engine, and derives a combination of optimum values that minimizes the fuel consumption amount based on the plural relational expressions by a mathematical technique such as an extremum finding algorithm or linear programming.

12. A vehicle control system according to claim 2, wherein said control unit sets said cooling motor fan as the object to be controlled, in the control operation in which the object to be controlled involved in at least two engine control sections among the engine control sections is controlled prior to the other objects to be controlled in order to optimize the fuel consumption amount of said engine.

13. A vehicle control system according to claim 2, wherein, in the control operation in which the object to be controlled involved in at least two engine control sections among the engine control sections is controlled prior to the other objects to be controlled in order to minimize the fuel consumption amount of said engine or in the control operation in which the auxiliary machines are controlled in the descending order of the magnitude of the motive power, said control section controls at least one of said engine cooling unit and said transmission unit oil temperature adjusting unit prior to other objects to be controlled regardless of the control priority order when any one of the water temperature of said engine, the oil temperature of said engine, and the oil temperature of said transmission unit is equal to or higher than a set temperature, the control being performed so as to reduce the water temperature of said engine, the oil temperature of said engine, or the oil temperature of said transmission unit to a lower value than the set temperature.

14. A vehicle control system according to claim 2, wherein said engine cooling unit includes:

a radiator configured to heat-exchange a cooling water with the outside air;

a cooling water passage through which the cooling water circulates between the radiator and said engine;

a water distribution amount adjusting unit configured to adjust a water distribution amount to the radiator; and a cooling water pump unit configured to adjust a circulated water amount of the cooling water.

15. A vehicle control system according to claim 2, further comprising:

an airconditioning unit including an airconditioning refrigeration cycle;

an airconditioner setting unit through which a passenger makes a setting; and an airconditioning control unit configured to control said airconditioning unit based on said airconditioner setting unit, wherein said airconditioning-dependent engine control section controls the refrigerant discharge rate of said airconditioning compressor and a rotation speed of said cooling motor fan via said airconditioning control unit, and while performing a control to minimize a total motive power of said airconditioning compressor and said cooling motor fan, the airconditioning-dependent engine control section controls said engine cooling unit according to a set condition of said cooling motor fan which is selected in the control to minimize the total motive power.

16. A vehicle control system according to claim 2, wherein said control unit controls said water distribution amount adjusting unit and said cooling water pump unit based on the set condition of said cooling motor fan and a target engine water temperature to make the water temperature of said engine equal to the target engine water temperature.

17. A vehicle control system according to claim 2, wherein said control unit varies control command values of the auxiliary machines including said airconditioning compressor to minimize a total load power of said alternator and said airconditioning compressor applied onto said engine, examines a change in the total load power, and automatically probes in which direction the control commands should be varied in order to minimize the total load power.

18. A vehicle control system according to claim 17, wherein said control unit stores a result of the probe regarding in which direction the control command values of the auxiliary machines should be varied in order to minimize the total load power, according to a use condition of at least one of the auxiliary machines and said engine, and controls the auxiliary machines based on the stored contents.

* * * * *